United States Patent
Aizawa (12)

(10) Patent No.: US 6,199,396 B1
(45) Date of Patent: Mar. 13, 2001

(54) REFRIGERANT PIPE UNIT FOR ROOM AIR-CONDITIONER

(76) Inventor: Nikichi Aizawa, 1-11-305 Minami-Rinkan, 4-chome, Yamato-shi, Kangawa-ken (JP)

( * ) Notice: Subject to any disclaimer, the term of this patent is extended or adjusted under 35 U.S.C. 154(b) by 0 days.

(21) Appl. No.: 09/268,979

(22) Filed: Mar. 16, 1999

(30) Foreign Application Priority Data

Mar. 17, 1998 (JP) .................................................. 10-067471
Mar. 15, 1999 (JP) .................................................. 11-068402

(51) Int. Cl.[7] .................................................. F25B 45/00
(52) U.S. Cl. .................................................. 62/292; 62/77; 62/299; 137/360; 251/148
(58) Field of Search .................................................. 62/292, 77, 299; 137/366; 251/148

(56) References Cited

U.S. PATENT DOCUMENTS

| 4,184,661 | * | 1/1980 | Kushner et al. | 251/82 |
| 5,095,716 | * | 3/1992 | You | 62/259.1 |
| 5,329,783 | * | 7/1994 | Yang | 62/183 |
| 5,396,774 | * | 3/1995 | Hubbell, Jr. | 62/77 |
| 5,460,005 | * | 10/1995 | Eden | 62/125 |
| 5,479,788 | * | 1/1996 | Roegner | 62/292 |
| 5,915,402 | * | 6/1999 | Mitchell II | 137/15 |
| 5,941,082 | * | 8/1999 | Huang | 62/77 |
| 5,957,147 | * | 9/1999 | Hubbell, Jr. | 137/15 |
| 6,016,661 | * | 1/2000 | Sagar | 62/149 |

FOREIGN PATENT DOCUMENTS 10-89815  4/1998  (JP) .

* cited by examiner

Primary Examiner—William Doerrler
Assistant Examiner—Mark Shulman
(74) Attorney, Agent, or Firm—Merchant & Gould P.C.

(57) ABSTRACT

A refrigerant pipe unit for a room air-conditioner includes two refrigerant pipes laid through a piping hole in the building wall and interconnecting an indoor unit and an outdoor unit of the room air-conditioner for circulation of a refrigerant through the room air-conditioner. A stop valve is attached to at least one end of each of the refrigerant pipes for blocking flow of the refrigerant between the indoor unit and the outdoor unit. A maximum size of the stop valve which is measured in a radial direction about the central axis of each refrigerant pipe is designed such that the stop valve attached to the end of each refrigerant pipe can pass through the piping hole while the other refrigerant pipe is present inside the piping hole. Thus, the air-conditioner can be disassembled while the refrigerant is kept sealed within the indoor unit, the outdoor unit and the refrigerant pipe unit.

21 Claims, 16 Drawing Sheets

REFRIGERANT PIPE UNIT FOR ROOM AIR-CONDITIONER

BACKGROUND OF THE INVENTION

1. Field of the Invention

The present invention relates to a refrigerant pipe unit interconnecting an indoor unit and an outdoor unit of a room air-conditioner for circulation of a refrigerant through the room air-conditioner.

2. Description of the Related Art

Room air-conditioners functioning to keep the temperature of the air in rooms at about 18 to 25° C. throughout the year are widely used.

As diagrammatically shown in FIG. 18, the conventional room air-conditioner 200 generally comprises an indoor unit 201, an outdoor unit 202, and two refrigerant pipes 203, 204 interconnecting the indoor and outdoor units 201, 202 for circulation of a refrigerant through the room air-conditioner. In the outdoor unit 202, a compressor 205 compresses the vaporous refrigerant to a higher pressure and passes it to an outdoor heat exchanger 206 where the vaporous refrigerant is condensed, giving off heat Q1 to the atmosphere. The liquid refrigerant is fed through to the refrigerant pipe 203 to an expansion valve 207 in the indoor unit 201. The expansion valve 201 expands the liquid refrigerant to a lower pressure and passes it to an indoor heat exchanger 208 where the liquid refrigerant is evaporated, absorbing heat Q2 from the surroundings. Thus, the temperature inside the room goes down. The vaporous refrigerant returns through the refrigerant pipe 204 to the compressor 205. The foregoing circulation of the refrigerant makes the room air-conditioner 200 serve as a cooling system.

Reversing the refrigerant circulating direction makes the room air-conditioner serve as a heat pump heating system, in which the refrigerant absorbs heat from the atmosphere at the outdoor heat exchanger and subsequently gives off this heat to the inside of the room at the indoor heat exchanger.

As generally known, the refrigerant pipes 203, 204 are laid through a piping hole 212 formed in a wall 211 of the building. After the piping work completes a clearance between the refrigerant pipes 203, 204 and the piping hole 212 is closed by a putty or a like sealing material 213 to protect the building against weather.

From the sealing point of view, the piping hole 212 in the building wall 211 is preferably as small as possible. But, a larger piping hole is convenient for the piping work. Heretofore, three diameters (65 mm, 75 mm and 85 mm) have been standardized for the piping hole 212. These standard piping diameters are selected depending on the capacity or power of a room air-conditioner in which the refrigerant pipes 203, 204 are used. For example, a 65-mm-diameter piping hole is chosen for home-use room air-conditioners, and an 85-mm-diameter piping hole is chosen for business-use room air-conditioners.

The present inventor has proposed a conventional room air-conditioner disclosed in Japanese Patent Laid-open Publication No. HEI 10-89815, entitled "Heat Exchanger and Method of Replenishing Refrigerant to the Same". The proposed room air-conditioner includes four valves provided at respective refrigerant inlets and outlets of indoor and outdoor units. When the air-conditioner is to be disassembled for moving or transportation, these four valves are closed, and after that the indoor unit, the refrigerant pipes and the outdoor unit are separated. A great part of the refrigerant is trapped inside the indoor and outdoor units. But, a small part of the refrigerant is emitted to the atmosphere when the refrigerant pipes are detached from the indoor and outdoor units. When the room air-conditioner is re-assembled at a new installation site, the refrigerant pipes are attached to the indoor and outdoor units. While all the valves are kept in the fully closed state, the refrigerant pipes are evacuated, then replenished with the refrigerant. Subsequently, all the valves are opened, thus placing the room air-conditioner in the operable condition.

Because the great part of the refrigerant, which is trapped within the indoor and outdoor units, can be used again, environmental contamination caused by emission of the refrigerant is reduced to the minimum.

However, as a demand for environmental preservation of the earth has increased year by year, emission of the refrigerant from the refrigerant pipes 203, 204 may also be rendered impermissible even though the emission quantity is small.

In addition, a prolonged use of the room air-conditioner may cause leakage of the refrigerant to the atmosphere, requiring replenishment of the refrigerant. This leakage also causes environmental disruption.

In recent years, a mixture of plural sorts of alternate Freon (a trademark for fluorocarbons) has been used as a refrigerant for room air-conditioners. Use of this type of refrigerant makes the replenishment substantially impossible because identification of leaked constituents is substantially impossible. Accordingly, when leakage of the refrigerant occurs, the alternate Freon mixture left in the room air-conditioner is fully removed, then a new alternate Freon mixture is filled in the room air-conditioner.

Under these circumstances, a technique which is capable of sealing the refrigerant inside the refrigerant pipes is required. The standard piping holes are sized to allow passage of two refrigerant pipes, but they do not allow passage of any conventional valve provided at an end of each refrigerant pipe.

In many cases, the refrigerant pipes are connected by the so-called flared type joining system. In this joining system, an end of a deoxidized copper pipe is inserted in a flare nut, then flared like a bell. The flared pipe end is subsequently forced against a chamfered front end of a nipple by tightly fastening the flared nut to the nipple. Because of the metal-to-metal contact, a joint formed between the refrigerant pipe and the nipple is liable to gradually allow leakage of the refrigerant due to a working error or vibrations. Additionally, since the diameter of the refrigerant pipes specified by Japanese Industrial Standards (JIS) is 8A or 10A (corresponding to a nominal diameter of 8 mm or 10 mm), a screwed pipe fitting is used for joining such small diameter pipes. The screwed pipe fitting is compact but it is insufficient to provide a reliable seal against leakage because the refrigerant can flow along threaded grooves. The screwed pipe fitting is susceptible to cracking at the bottom of the threaded grooves.

SUMMARY OF THE INVENTION

It is accordingly an object of the present invention to provide a refrigerant pipe unit for a room air-conditioner, which can pass through a standard piping hole in the building wall while a refrigerant is kept sealed inside the refrigerant pipe unit.

According to the present invention, there is provided a refrigerant pipe unit for a room air-conditioner including an indoor unit disposed inside a building and an outdoor unit disposed on the outside of the building, the building including a wall having a piping hole extending therethrough. The refrigerant pipe unit comprises two refrigerant pipes extending through the piping hole and interconnecting the indoor unit and the outdoor unit to form a refrigerant passage for circulation of a refrigerant through the room air-conditioner, and a stop valve attached to at least one of opposite ends of each of the two refrigerant pipes for blocking flow of the refrigerant between the indoor unit and the outdoor unit. A maximum size of the stop valve, which is measured in a radial direction about the central axis of each refrigerant pipe, is designed such that the stop valve attached to the one end of each refrigerant pipe can pass through the piping hole in the building wall while the other refrigerant pipe is present inside the piping hole.

When the room air-conditioner is to be moved to another place, stop valves associated with the indoor and outdoor units and the stop valves of the refrigerant pipe unit are fully closed. With the stop valves thus closed, a portion of the refrigerant is trapped inside the refrigerant pipe unit. Then, the refrigerant pipe unit is detached from one of the indoor and outdoor units which is located near the stop valves of the refrigerant pipe unit. The refrigerant pipe unit is subsequently pulled toward the other unit. Since the stop valve attached to one end of each refrigerant pipe can pass through the piping hole while the other refrigerant pipe is present inside the piping hole, the refrigerant pipe unit is removed from the building while the refrigerant is kept sealed inside the refrigerant pipe unit. In the case where the stop valve is provided at both ends of each refrigerant pipe, the refrigerant pipe unit can be removed or withdrawn through the piping hole toward either side of the building wall. The refrigerant pipe unit is transported to a new installation site of the room air-conditioner and is again assembled with the indoor and outdoor unit. During that time, the refrigerant is retained inside the refrigerant pipe unit.

In one preferred form, the stop valve includes a valve stem placed at an angle of 30° to 60° to the central axis of each refrigerant pipe. The stop valve having such inclined valve stem is relatively slim and can readily pass through the piping hole without interference with a peripheral wall of the piping hole. This angle is preferably 45°.

The stop valve and the one end of each refrigerant pipe may be connected together by a flange coupling. In this case, the maximum size of the stop valve is preferably smaller than a maximum radius of the flange coupling. The flange coupling includes a first flange slipped on and brazed to the one end of each refrigerant pipe, and a second flange slipped on and brazed to an inlet portion of the stop valve. The first and second flanges are connected together with a seal member disposed therebetween. The flange coupling provides a hermetic seal against leakage of the refrigerant. Additionally, the first and second flanges may have a recessed arcuate edge portion receptive of a portion of the circumference of the other refrigerant pipe. This provides an additional reduction in the maximum diameter of the refrigerant pipe unit.

In one preferred form of the invention, the stop valve includes a tubular valve case joined at one end to the second flange and having a curved intermediate portion. An annular valve seat is fixedly mounted in the other end of the tubular valve case. An internally threaded hollow cylindrical valve stem guide is mounted to the curved intermediate portion of the valve case in coaxial relation to the annular valve seat. An externally threaded valve stem is threaded into the valve stem guide. A valve disc is attached to an inner end of the valve stem and is adapted to be engaged with and disengaged from the valve seat for closing and opening the stop valve in response to axial movement of the valve stem. An end cap is attached to an outer end of the valve stem guide to close the outer end. A first seal member is disposed between the valve seat and the valve case. A second seal member is fitted around the valve stem and is held between the valve stem guide and the end cap. The valve stem is placed at an angle of 30° to 60°, preferably 45° to the central axis of each refrigerant pipe.

The stop valve may further include an additional tubular valve case firmly connected at one end to the other end of the valve case and having a curved intermediate portion, and a third flange slip on and brazed to the other end of the additional tubular valve case. The third flange has a refrigerant supply hole extending radially through the third flange and connected at one end to an internal space of the additional valve case. A self-closing valve mechanism is assembled in the refrigerant supply hole. An end plug is detachably mounted in an outer end of the refrigerant supply hole to normally close the refrigerant supply hole.

In another preferred form of the invention, the stop valve includes a generally hollow cylindrical valve case having an internally threaded axial through-hole and a pipe-receiving hole extending at an angle to the axial through-hole. An annular valve seat is fixedly mounted in one end of the axial through-hole, and an externally threaded valve stem is threaded into the externally threaded axial through-hole. A valving member formed integrally with an inner end of the valve stem is adapted to be engaged with and disengaged from the valve seat for closing and opening the stop valve in response to axial movement of the valve stem. An end plug is detachably mounted in the axial through-hole to close the other end of the axial through-hole. A seal member is fitted around the valve stem to seal between the valve stem and the valve case. The pipe-receiving hole is connected at one end to the axial through-hole and at the other end to the end of each refrigerant pipe. The angle between the axial through-hole and the pipe-receiving hole is in the range of 30° to 60°, preferably 45°.

The valve stem may have a shaped hole formed at an outer end thereof for receiving a tip end of a tool to cause the axial movement of the vale stem. The valve case may further has a refrigerant supply hole connected at one end to the axial through-hole, and a self-closing valve mechanism assembled in the refrigerant supply hole. An end plug is detachably mounted in the other end of the refrigerant supply hole to close the refrigerant supply hole.

The above and other objects, features and advantages of the present invention will become apparent to those versed in the art upon making reference to the following description and accompanying sheets of drawings in which certain preferred structural embodiments of the present invention are described by way of illustrative examples.

DETAILED DESCRIPTION OF THE PREFERRED EMBODIMENTS

Certain preferred embodiments of the present invention will be described in greater detail with reference to the accompanying drawings.

Figure 1:
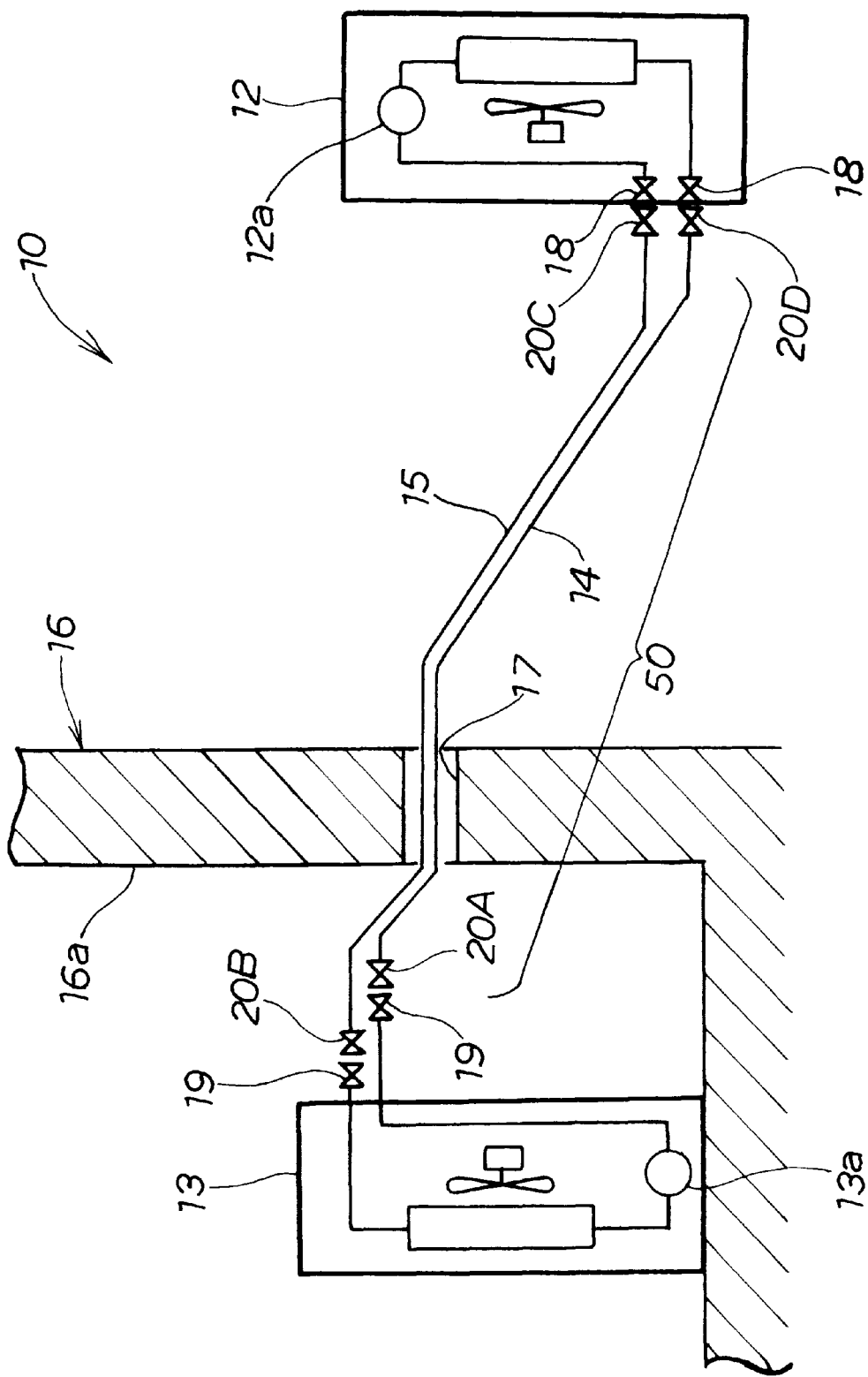
FIG. 1 is a diagrammatical view showing the general arrangement of a room air-conditioner in which a refrigerant pipe unit according to the present invention is incorporated.

Referring now to FIG. 1, there is shown the general arrangement of a room air-conditioner 10 in which a refrigerant pipe unit according to the present invention is incorporated. The room air-conditioner 10 generally comprises an outdoor unit 12 disposed on the outside of a building 16, an indoor unit 13 disposed inside the building 16, and two refrigerant pipes 14, 15 interconnecting the outdoor unit 12 and the indoor unit 13 to form a refrigerant passage for circulation of a refrigerant through the air-conditioner 10. The refrigerant pipes 14, 15 are laid through a piping hole 17 formed in a wall 16a of the building 16. A stop valve 20A, 20D; 20B, 20C is attached to opposite ends of each of the refrigerant pipes 14, 15 for blocking flow of the refrigerant between the outdoor unit 12 and the indoor unit 13. A maximum size of the stop valves 20A–20D, which is measured in a radial direction about the central axis of each refrigerant pipe 14, 15, is designed such that the stop valve 20A, 20D; 20B, 20C connected at each end of one refrigerant pipe 14 or 15 can pass through the piping hole 17 while the other refrigerant pipe 15 or 14 is present inside the piping hole 17. The refrigerant pipes 14 and 15 and the stop valves 20A, 20D and 20B, 20C attached thereto jointly form a refrigerant pipe unit 50.

Figure 18:
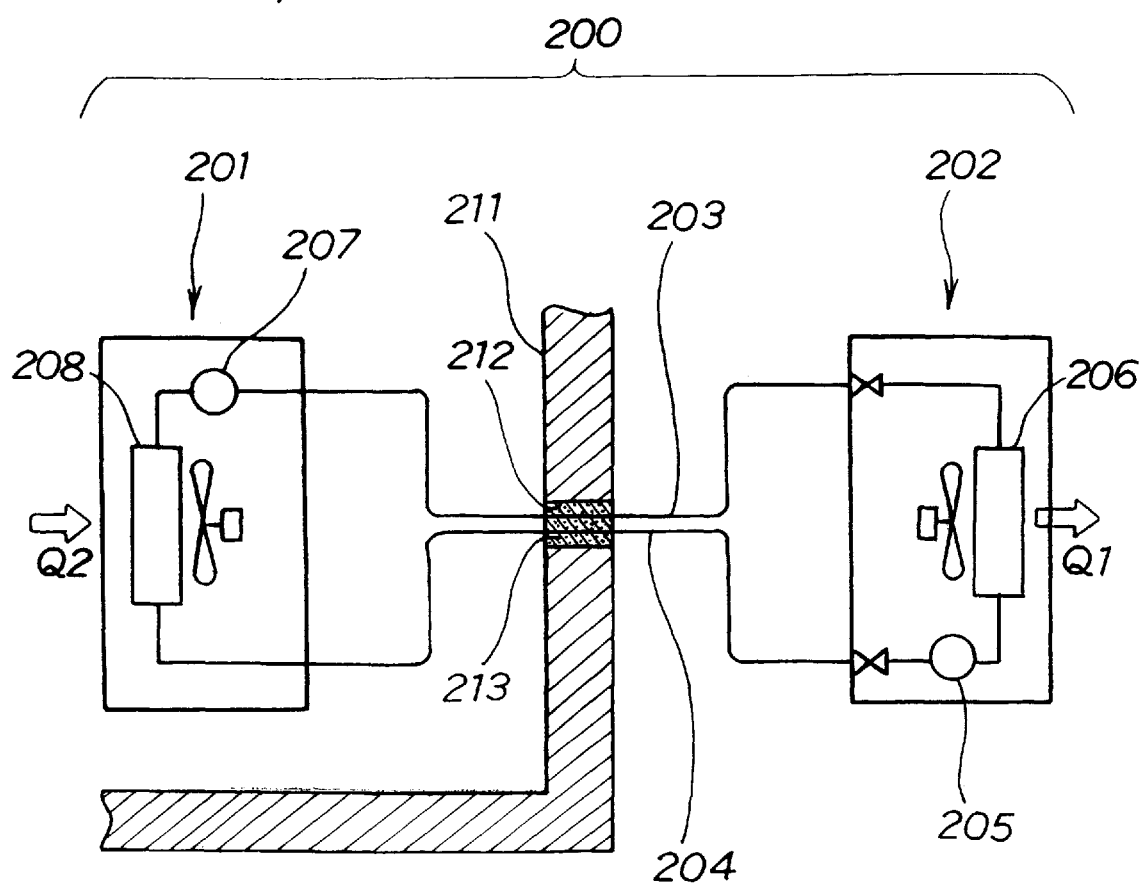
FIG. 18 is a diagrammatical view showing the general arrangement of a conventional room air-conditioner.

The room air-conditioner 10 further includes two stop valves 18, 18 provided on the outdoor unit 12 for trapping the refrigerant within a part of the refrigerant passage formed inside the outdoor unit 12, two stop vales 19, 19 provided on the indoor unit 13 for trapping the refrigerant within a part of the refrigerant passage formed inside the indoor unit 13. The stop valves 18, 18 are detachably connected to the stop valves 20C, 20d of the refrigerant pipe unit 50, and the stop valves 19, 19 are detachably connected to the stop valves 20A, 20B of the refrigerant pipe unit 50. The outdoor unit 12 includes a compressor 12a, and the indoor unit 13 includes an expansion valve 13a. While the room air-conditioner 10 is in operation, the refrigerant circulates through the air-conditioner 10 in a direction opposite to the refrigerant circulating direction in the conventional room air-conditioner 200 described above with reference to FIG. 18. The internal structure and operation of the outdoor and indoor units 12, 13 are substantially the same as those of the conventional room air-conditioner 200 and further description thereof can, therefore, be omitted.

The room air-conditioner 10 is occasionally disassembled when occupants of the building move to another place. In this instance, the following steps will be taken to disassemble the existing room air-conditioner.

At first, in FIG. 1 the stop valves 18, 18 provided on the outdoor unit 12, the stop valves 19, 19 provided on the indoor unit 13, and the stop valves 20A–20D of the refrigerant pipe unit 50 are fully closed so that the refrigerant is trapped within respective refrigerant passage portions formed inside the outdoor unit 12, indoor unit 13 and refrigerant pipe unit 50.

Then, the stop valves 18, 18 and the mating stop valves 20C, 20D are disconnected to separate the outdoor unit 12 and the refrigerant pipe unit 50. Similarly, the stop valves 19, 19 and the mating stop valves 20A, 20B are disconnected to separate the indoor unit 13 and the refrigerant pipe unit 50.

Figure 2:
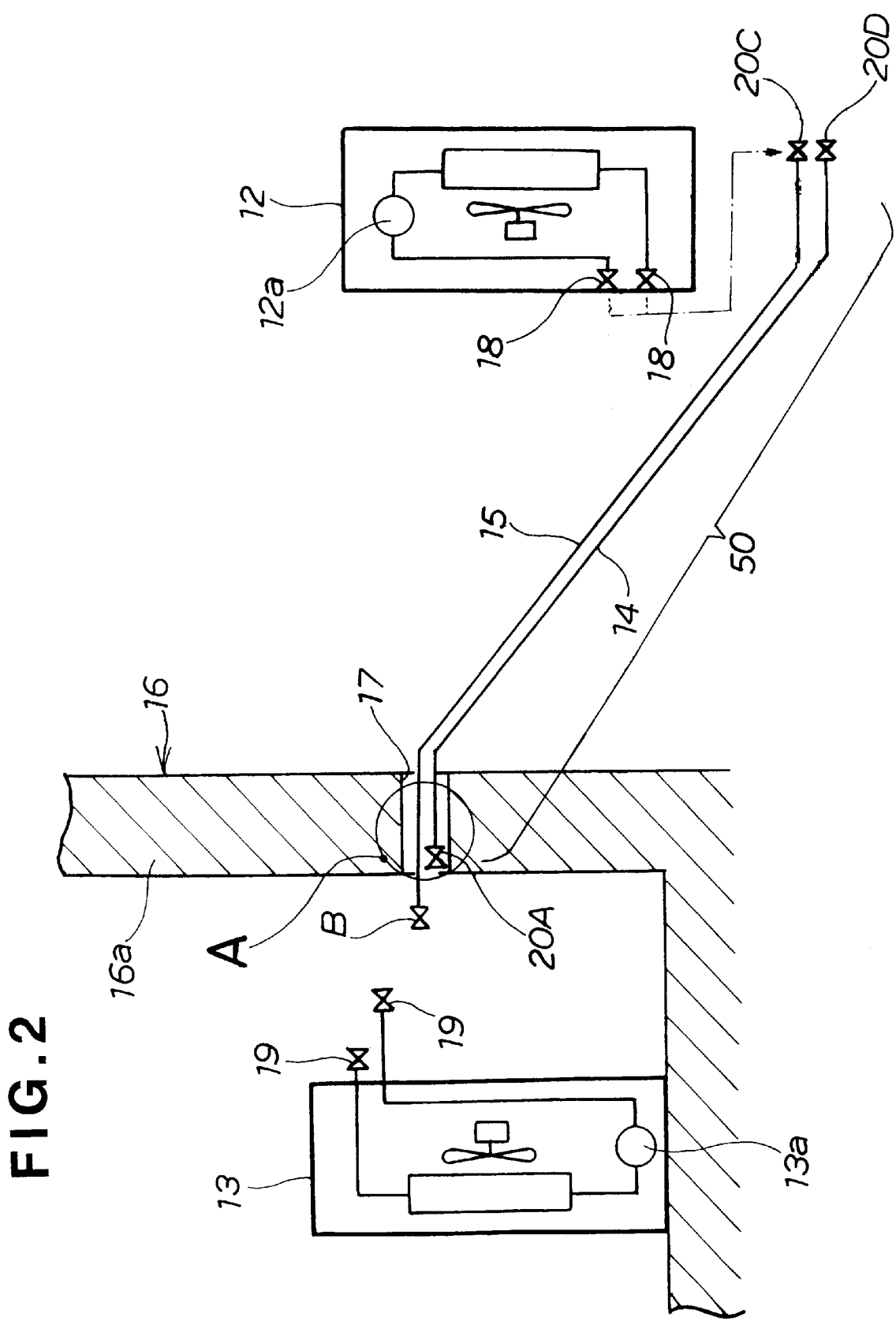
FIG. 2 is a diagrammatical view showing the manner in which the refrigerant pipe unit is detached from indoor and outdoor units of the room air-conditioner.

Subsequently, as shown in FIG. 2, the refrigerant pipe unit 50 is pulled or withdrawn from the room interior to the outside of the building 16. During that time, because the refrigerant pipes 14, 15 are usually bound together by a fabric tape (not shown), the stop valves 20A and 20B pass in succession through the piping hole 17 of the building wall 16a. Thus, the two refrigerant pipes 14, 15 of the refrigerant pipe unit 50 can be removed at one time. This particularly advantageous because of high working efficiency.

The stop valves 20A–20D of the refrigerant pipe unit 50 are all the same in construction and operation. Accordingly, only one stop valve 20A will be described in greater detail with reference to FIGS. 3 and 4.

Figure 3:
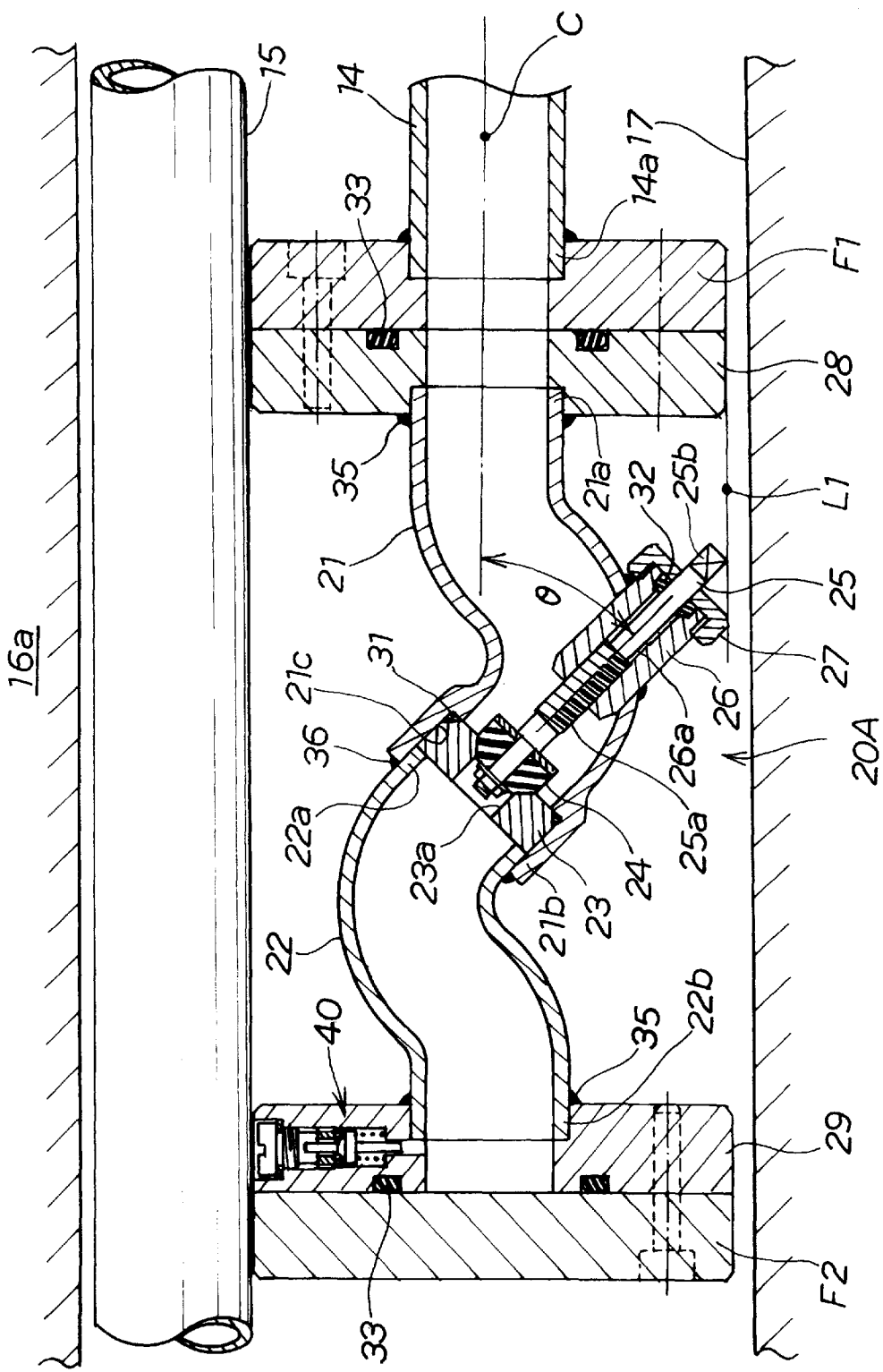
FIG. 3 is an enlarged detailed view, with parts in cross-section, of a portion in a circle A shown in FIG. 2.
Figure 4:
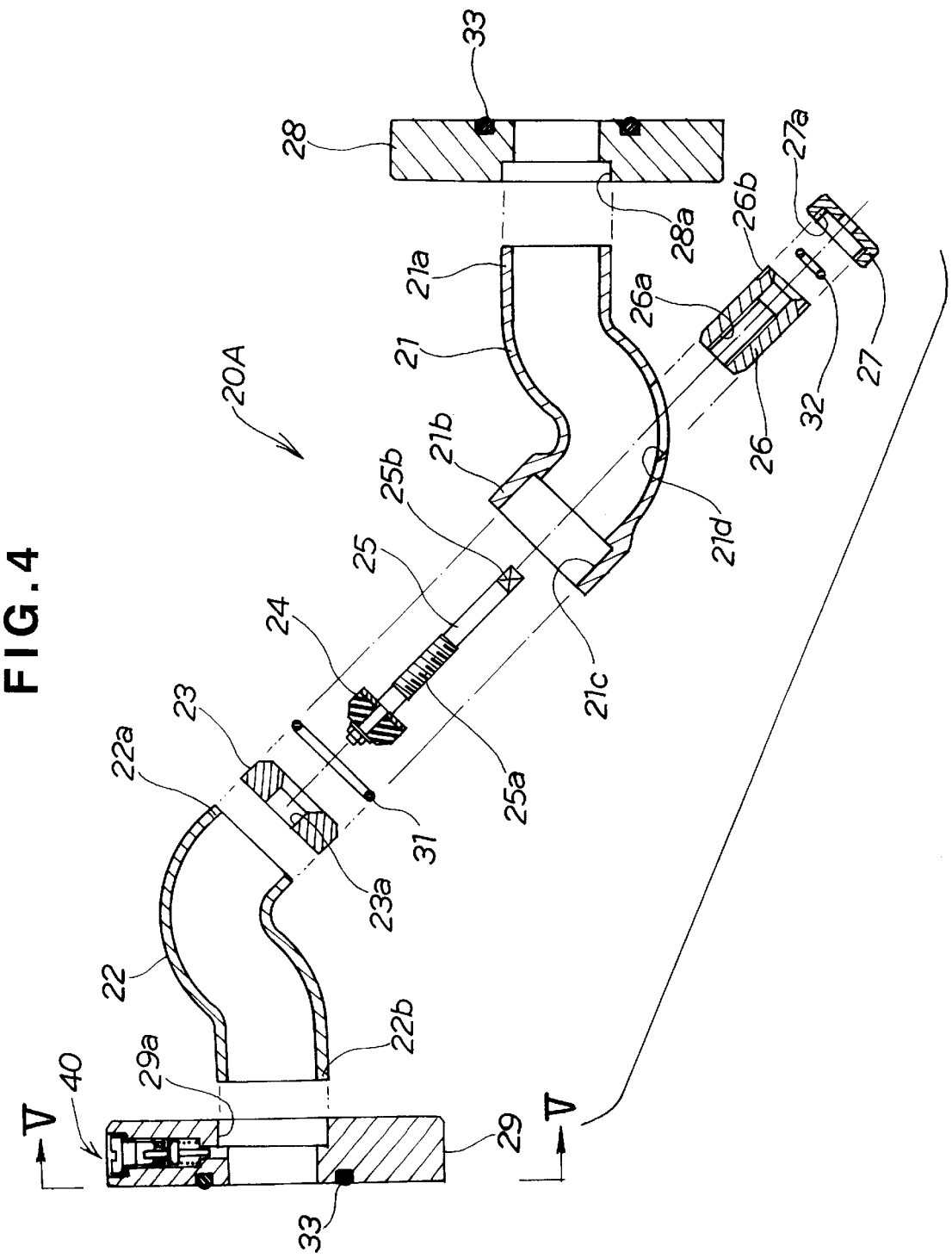
FIG. 4 is an exploded view showing a stop valve of the refrigerant pipe unit.
Figure 5:
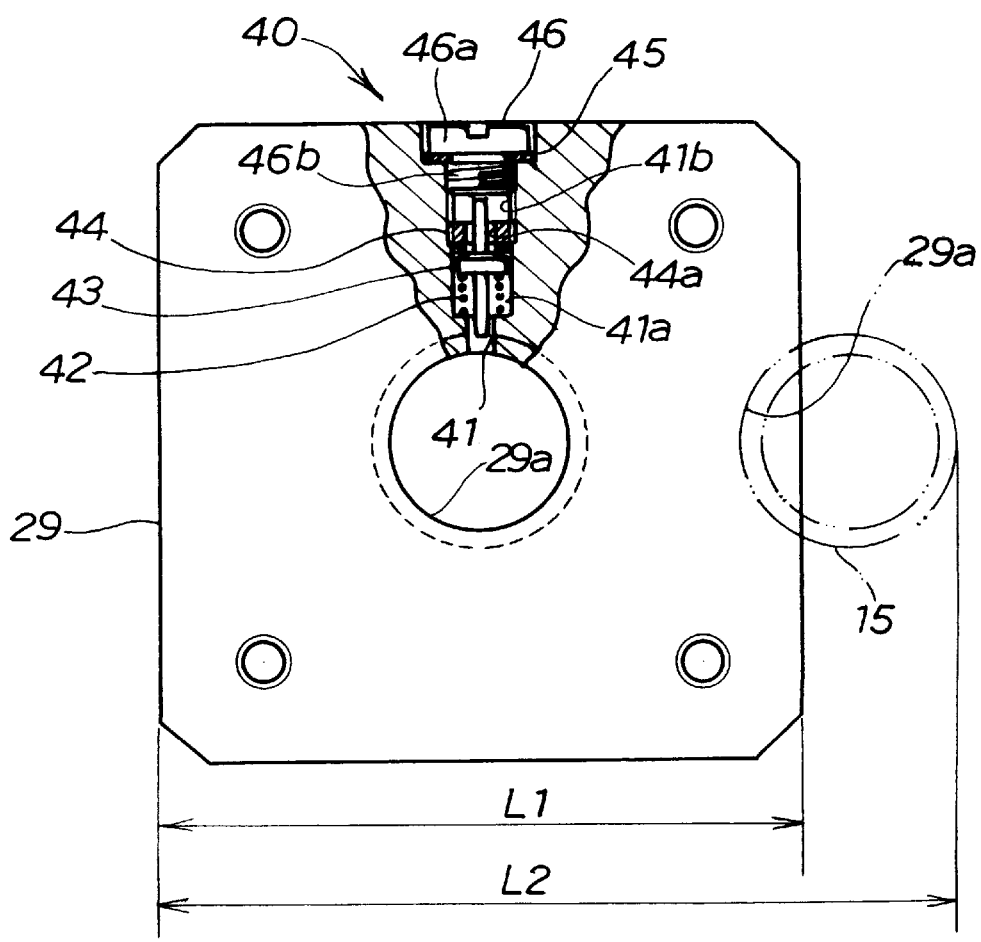
FIG. 5 is an end view, with parts cutaway for clarity, of a flange of the stop valve looking in the direction of the arrows V—V of FIG. 4, showing a self-closing valve mechanism assembled in a refrigerant supply hole.

The stop valve 20A generally comprises a tubular first valve case 21, a tubular second valve case 22, a valve seat 23, a valve disc 24, a valve stem 25, a valve stem guide 26, an end cap 27, right and left flanges 28, 29 and O-rings 31, 32, 33 of different sizes. The valve cases 21, 22, valve seat 23, valve stem 25, valve stem guide 26, end cap 27 and flanges 28, 29 are made of bronze, cast iron, cast steel or cast stainless steel. The flanges 28, 29 are square flanges having a width L1 (FIGS. 3 and 5).

The tubular first valve case 21 is bent or curved so that the central axis of an inlet end 21a and the central axis of an outlet end 21b cross at an angle with each other. The inlet end 21a of the first valve case 21 is fitted in a large-diameter portion of a stepped hole 21a formed centrally in the right flange 28. The inlet end 21a is brazed to the flange 28 as at 35 shown in FIG. 3. Thus, the flange 28 is a slip-on brazed flange. The outlet end 21b of the first valve case 21 has a counter bore 21c for receiving therein the valve seat 23 with the O-ring 31 disposed between the valve seat 23 and the counter bore 21c. The first valve case 21 further has a circular hole or opening 21d formed at the curved portion in coaxial relation to the counter bore 21c of the outlet end 21b for attachment of the valve stem guide 26 to the first valve case 21. The flange 28 is connected to a slip-on brazed flange F1 at one end 14a of the refrigerant pipe 14 with the O-ring 33 disposed therebetween.

The tubular second valve case 22 is bent or curved so that the central axis of an inlet end 22a and the central axis of an outlet end 22b cross at an angle with each other. The inlet end 22a of the second valve case 22 is fitted in the counter bore 21c of the first valve case 21 from behind the valve seat 23. The inlet end 22a of the second valve case 22 and the outlet end 21b of the first valve case 21 are brazed together as at 36 shown in FIG. 3. The outlet end 22b of the second valve case 22 is fitted in a large diameter portion of a stepped hole 29a formed centrally in the left flange 29. The outlet end 22b is brazed to the flange 29 as at 35 shown in FIG. 3. Thus, the flange 29 is a slip-on brazed flange. A blank flange F is attached to the flange 29 with the O-ring 33 disposed therebetween to seal the refrigerant against leakage.

The valve stem guide 26 comprises a hollow cylindrical sleeve having an internally threaded axial central hole 26a and an externally threaded end portion 26b. The valve stem guide 26 is inserted into the first valve case 21 through the opening 21d (FIG. 4) so that the externally threaded end portion 26a projects outwardly from the curved portion of the first valve case 21, and an opposite end portion is received inside the first valve case 21. The internally threaded axial central hole 26a (FIG. 4) is coaxial with the central axis of the valve seat 23 firmly held between the outlet end 21b of the first valve case 21 and the inlet end 21a of the second valve case 22. The valve seat 23 has a central hole 22a for the passage therethrough of the refrigerant. The valve stem guide 26 is brazed to the curved portion of the first valve case 21.

Since heat generated by brazing is much smaller than that of welding, the brazing does not impair the O-ring 31. The O-rings 32 and 33 are attached after the brazing, and so they are free from deterioration by heat.

The valve stem 25 has an externally threaded intermediate portion 25a threaded into the internally threaded axial central hole 26a of the valve stem guide 26. An inner end portion of the valve stem 25 is received in the first valve case 21, and the valve disc 24 is attached to the inner end portion of the valve stem 25. An outer end portion 25b of the valve stem 25 projects outwardly from the valve stem guide 26. The outer end portion 25b has a polygonal cross-sectional shape, such as a square or a hexagon. Thus, by using a suitable tool, such as a polygonal box wrench having a tip end fitted over the polygonal end portion 25b, the valve stem 25 is turned so that the valve stem 25 is displaced in the axial direction thereof. With this axial movement of the valve stem 25, the valve disc 24 attached to the inner end of the valve stem 25 is brought into and away from pressure contact with the valve seat 23 to selectively close and open the central hole 23a of the valve seat 23.

The end cap 27 has an internally threaded axial central hole 27a (FIG. 4) and is threaded over the externally threaded end portion 26b (FIG. 4) of the valve stem guide 26 with the O-ring 32 held between the valve stem 25, the valve stem guide 26 and the end cap 27. The length of the externally threaded intermediate portion 25a of the valve stem 25 is determined such that when the stop valve 20A is in the fully opened state, the externally threaded intermediate portion 25a does not interfere with the O-ring 32. The O-ring 32 can, therefore, continue providing an effective hermetic seal between the valve stem 25 and the valve stem guide 26 regardless of the position of the stop valve 20A.

As shown in FIG. 3, the valve stem 25 of the stop valve 20A is placed at an angle θ to the central axis C of the refrigerant pipe 14. It should be noted that the angle θ ranges from 30° to 60° and is preferably 45°. If the valve stem 25 is placed at right angles (90°) to the central axis C, as in the conventional stop valve, the valve stem 25 projects greatly from the valve stem guide 26 to such an extent that the outer end portion 25b of the valve stem 25 interferes with a peripheral wall of the piping hole 17. This means that the conventional stop valve attached to an end of the refrigerant pipe 14 cannot pass through the piping hole 17. If the angle θ is less than 30°, the valve stem 25 extends up to the proximity of the flange 28, producing various limitations on the design of the stop valve 20A. If the angle θ exceeds 60°, the length of an outwardly projecting part of the valve stem 25 exceeds an allowable limit, causing interference between the valve stem 25 and the peripheral wall of the piping hole 17.

In the illustrated embodiment, when the stop valve 20A is in the fully closed state, a tip end of the outer end portion 25b of the valve stem 25 does not located outside the width (L1) of the flange 28, 29. If the tip end of the valve stem 25 projects beyond the periphery of the flange 28, the valve stem tip end is likely to interfere with the peripheral wall of the piping hole 17 when the refrigerant pipe 14 is pulled in a direction to remove the stop valve 20A through the piping hole 17 while the refrigerant pipe 15 is present inside the piping hole 17. When the stop valve 20a is in the fully open state, the valve stem 25 may project beyond the periphery of the flange 28 because the stop valve 20A is located inside the building 16.

Supposing that the piping hole 17 is a standard piping hole having a diameter of 65 mm, the refrigerant pipe 14 is a JIS 8A pipe having an outside diameter of 13.8 mm, the refrigerant pipe 15 is a JIS 10A pipe having an outside diameter of 14.3 mm, and the flanges 28, 29 are 8A square flanges having a width of 47 mm, then a maximum outside diameter of a space occupied by the stop valve 20A and the refrigerant pipe 15 within the piping hole 17 is to be 64.3 mm (64.3 mm+14.3 mm). Because the maximum outside diameter (64.3 mm) is smaller than the diameter (65 mm) of the piping hole 17, the stop valve 20A can pass through the piping hole 17 while the refrigerant pipe 15 is present inside the piping hole 17.

Figure 6:
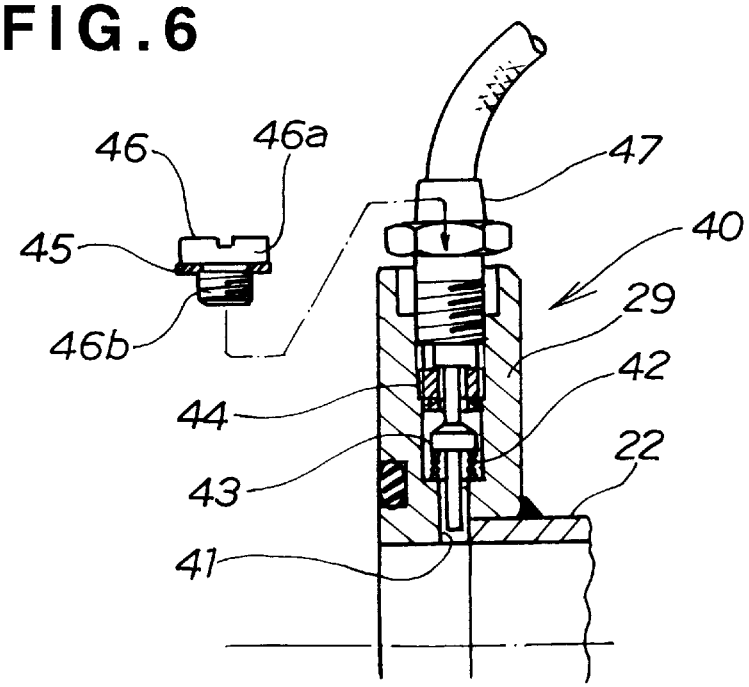
FIG. 6 is a cross-sectional view illustrative of the operation of the self-closing valve mechanism when a refrigerant is removed from the room air-conditioner.

The flanges 28, 29 may have an arcuate recess 29a (FIG. 5) as indicated by the phantom lines shown in FIG. 5. The refrigerant pipe 15 is partly received in the recesses 29a of the flanges 28, 29, as shown in FIG. 6. This arrangement enables further reduction of the maximum outside diameter L2 of the space which is occupied by the stop valve 20A (FIG. 3) and refrigerant pipe 15 when they are received in the piping hole 17 (FIG. 3). Accordingly, a piping hole having a diameter smaller than 65 mm can be used.

The stop valve 20A shown in FIG. 3 has a self-closing valve mechanism 40 assembled in a refrigerant supply hole formed in the flange 29.

As shown in FIG. 5, the self-closing valve mechanism 40 includes a compression coil spring 42, a poppet 43, a valve seat 44, a seal ring 45 and an end plug 46 received in a multi-stepped radial through-hole 41 of the flange 29 in the order named when viewed from an inner end of the radial through-hole 41. The inner end of the radial through-hole 41 is connected to the stepped central hole 29a of the flange 29. The radial through-hole 41 forms the refrigerant supply hole.

The compression coil spring 42 and the poppet 43 are received in a second innermost portion 41a of the multi-stepped radial through-hole 41 in such a manner that the poppet 43 is urged upwardly by the compression coil spring 42. A second outermost portion 41b immediately above the second innermost portion 41b of the multi-stepped radial through-hole 41 is internally threaded. The valve seat 44 is threaded into the internally threaded second innermost portion 41b until it comes into abutment with a step between the second innermost portion 41a and the second outermost portion 41b. The poppet 43 urged upwardly by the spring 42 is normally held in abutment with the valve seat 44 and thus closes an opening 44a of the valve seat 44. Thus, the self-closing valve mechanism 40 including the poppet 43 urged against the valve seat 44 by the force of the spring 42 in normally held in the closed state as shown in FIG. 5.

The end plug 46 comprises a screw plug having an enlarged head 46a at one end of an externally threaded stem 46b. The screw plug 46 is threaded into the externally threaded second outermost portion 41b of the multi-stepped radial through-hole 41 with the seal ring 45 disposed between the head 46a of the screw plug 46 and an outermost step of the radial through-hole 41.

The self-closing valve mechanism 40 assembled in the refrigerant supply hole 41 can prevent leakage of the refrigerant from the refrigerant pipe unit 50 (FIGS. 1 and 2) unless the poppet 43 is forced to disengage from the valve seat 44 against the force of the compression coil spring 42. The screw plug 46 threaded into the radial through-hole 41 inhibits free access to the self-closing poppet 43 which may cause the poppet 43 to disengage from the valve seat 4. The self-closing valve mechanism 40 and the seal ring 45 provide a double seal structure to the refrigerant supply hole. The head 46a of the screw plug 46 is grooved so that the screw plug 46 can be removed from the radial through-hole 41 by turning it using a suitable tool, such as a screwdriver, having a shaped tip end fitted into the grooved head 46a.

Description is now given of operation of the self-closing valve mechanism 40 with reference to FIG. 6.

When the refrigerant is to be discharged or removed from the room air-conditioner 10 (FIG. 1), all of the stop valves 18, 18, 19, 19 and 20A–20D are fully opened. Then, the screw plug 46 is removed from the radial through-hole (refrigerant supply hold) 41 of the stop valve 20A. Subsequently, a vacuum hose 47 connected to a vacuum source such as a vacuum pump (not shown) is inserted into the radial through-hole 41 until it forcibly displaces the poppet 43 downwards against the force of the compression coil spring 42. The opening 44a of the valve seat 44 is thus opened whereupon the refrigerant is down out from the room air-conditioner 10 (FIG. 1), then recovered into a container or tank (not shown) through the vacuum hose 47. When the refrigerant in the room air-conditioner 10 is fully removed, the vacuum hose 47 is removed from the radial through-hole 41. This allows the poppet 43 to immediately return to its original valve-closing position (FIG. 5) under the force of the spring 42. Outside air is, therefore, prevented from entering the refrigerant passage in the room air-conditioner 10 (FIG. 1). Then, the screw plug 46 is threaded into the radial through-hole 41 with the seal ring 45 carried immediately below the head 46a of the screw plug 46. Thus, the radial through-hole (refrigerant supply hold) 41 is closed. In the refrigerant supply hold 41, a double seal structure is formed by the ring seal 45 and the self-closing valve mechanism 40.

When the refrigerant is to be charged into the room air-conditioner 10 (FIG. 1), the vacuum hose 47 is replaced by a refrigerant charging hose (not shown) connected to a refrigerant supply source (not shown) such as a feed pump. The sequence of working processes achieved for the refrigerant charging is the same as that of the refrigerant removing previously described, and no further description is necessary.

Figure 7:
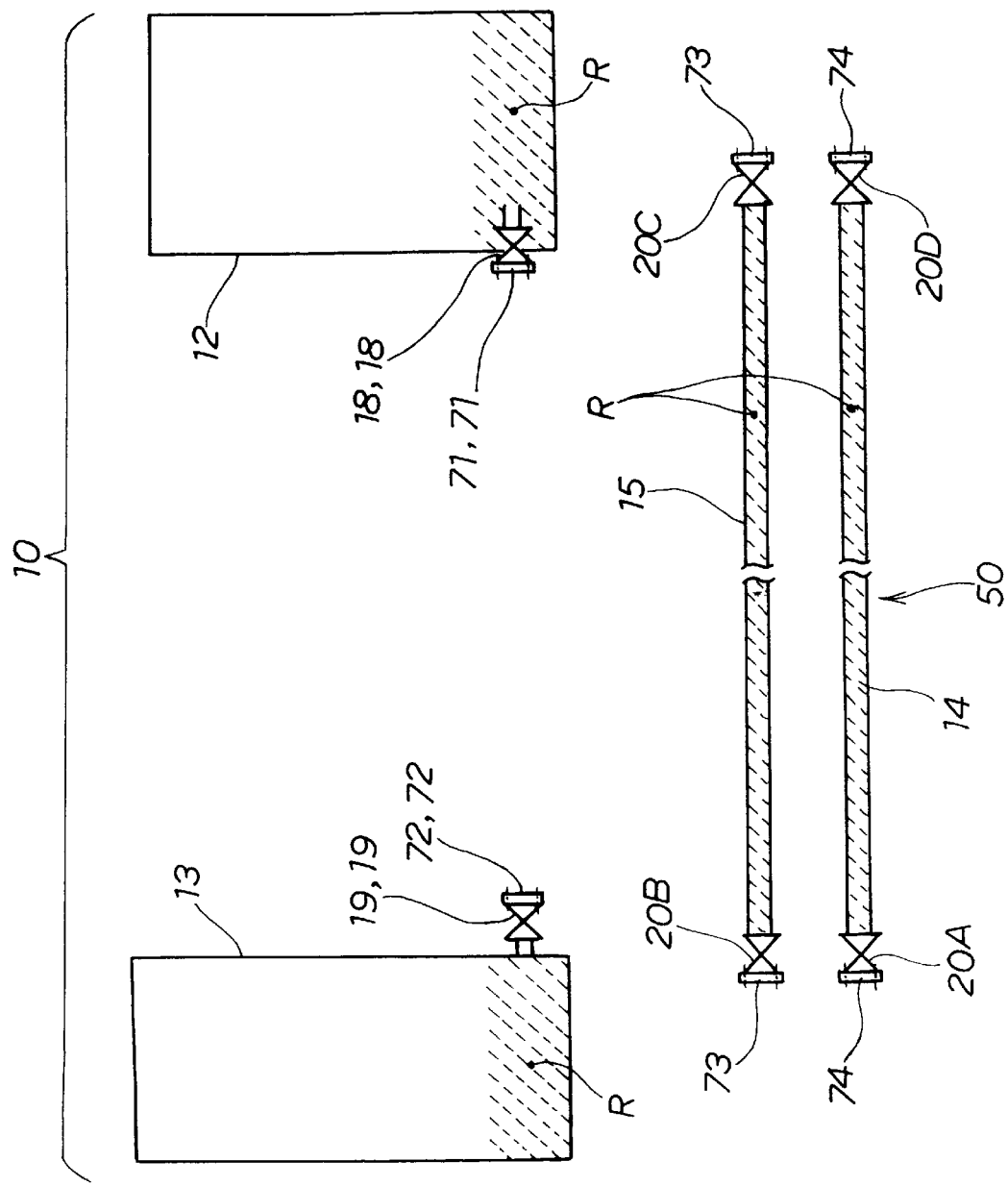
FIG. 7 is a diagrammatical view showing the room air-conditioner in the disassembled state.

FIG. 7 illustrates the room air-conditioner 10 with parts shown in the disassembled state. The stop valves 18, 18, 19, 19 and 20A–20D are fully closed before the room air-conditioner 10 is disassembled. Accordingly, a part of the refrigerant R is sealed within the outdoor unit 12, another part of the refrigerant R is sealed within the indoor unit 13, and still another part of the refrigerant is sealed within the refrigerant pipes 14, 15 of the refrigerant pipe unit 50. To perfectly prevent leakage of the refrigerant, blank flanges 71, 71, 72, 73, 73, 74, 74 are attached to the stop valves 18, 18, 19, 19, 20A–20D, respectively, with gaskets (not shown) disposed therebetween.

Than the outdoor and indoor units 12, 13 and the refrigerant pipe unit 50 are transported to a new installation side of the room air-conditioner 10 and after that they are again assembled together. During the transportation and re-assembling, the refrigerant R is kept sealed within the outdoor and indoor units 12, 13 and the refrigerant pipe unit 50. When the room air-conditioner 10 is to be scrapped due to deterioration, the outdoor and indoor units 12, 13 and the refrigerant pipe unit 50 are also disassembled in the condition shown in FIG. 7, then transported to a scrapping plant.

Figure 8A:
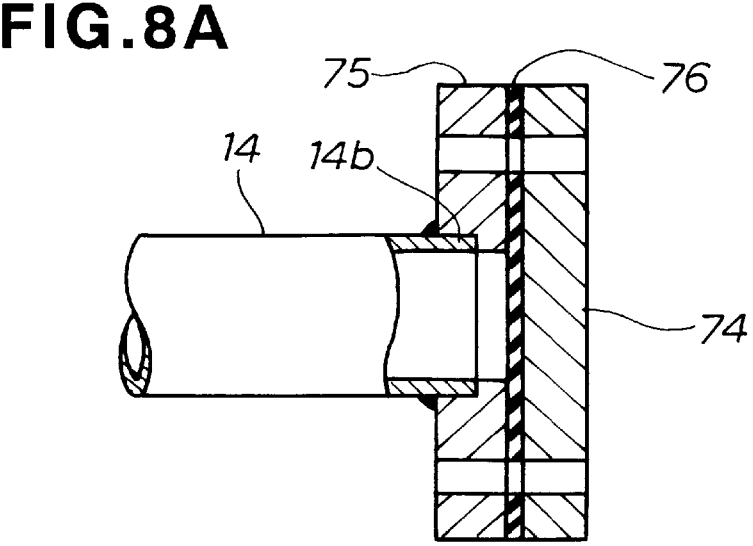
FIGS. 8A, 8B and 8C are cross-sectional views showing variants of a sealing structure associated with one end of a refrigerant pipe.
Figure 8B:
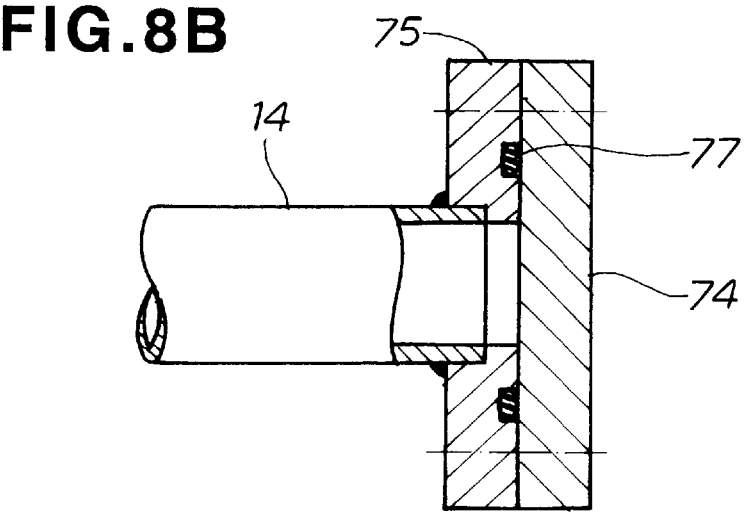
Figure 8C:
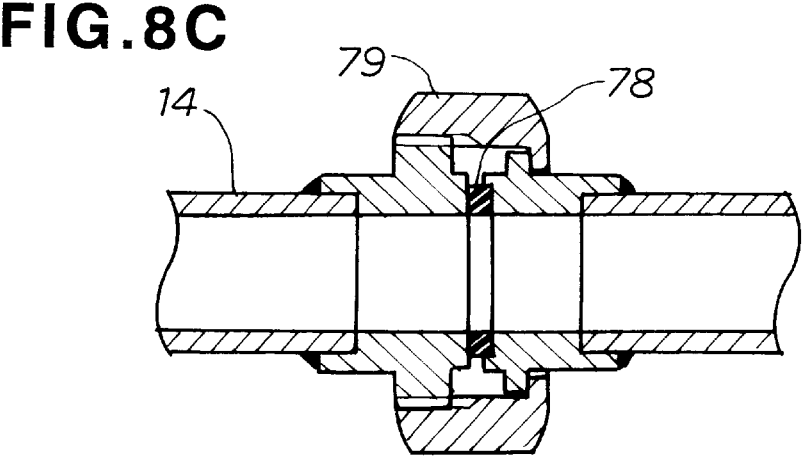

As shown in FIG. 8A, the other end 14a of the refrigerant pipe 14 has a slip-on brazed flange 75 to which the blank flange 74 is attached by screw fasteners (not shown) with the gasket 76 disposed between the two flanges 74, 75. a seal structure including the gasket 76 may be replaced by a seal structure having an O-ring 77, as shown in FIG. 8B. FIG. 8C shows another modified form of the seal structure which includes a union coupling having a built-in gasket 78. In use, the gaskets 76, 77, 78 are compressed or squeezed at a predetermined pressure so that the seal structures shown in FIGS. 8A, 8B and 8C can retain a sufficient sealing ability even when an adjacent refrigerant pipe 14 undergoes deformation unless this deformation produces a critical damage on the flange 75, the blank flange 74 or the union 79. The gaskets 76–78 are highly resistant to external forces, vibrations and aging and you can retain the desired sealing properties over ten years.

Figure 9:
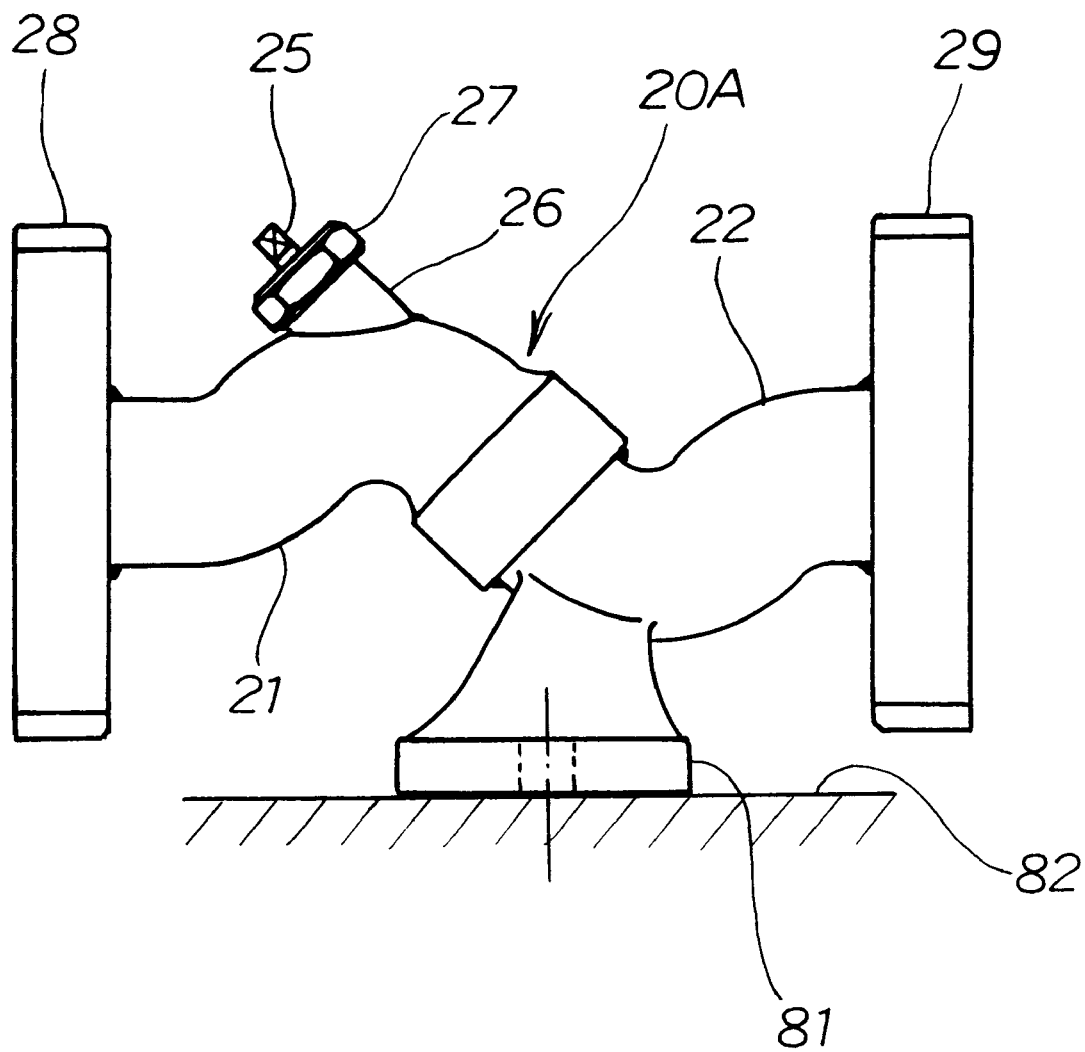
FIG. 9 is a front elevational view showing a modification of the stop valve shown in FIG. 3.

FIG. 9 shows a modified form of the top value 20A according to the present invention. The modified stop valve 20A differs from the stop valve shown in FIG. 3 in that an integral leg 81 is provided for enabling the stop valve 20A to be fixed to an adjacent bracket 82. Preferably, the leg 81 is formed integrally with the valve case 22 so as not to affect operation of the valve stem 25.

Figure 10:
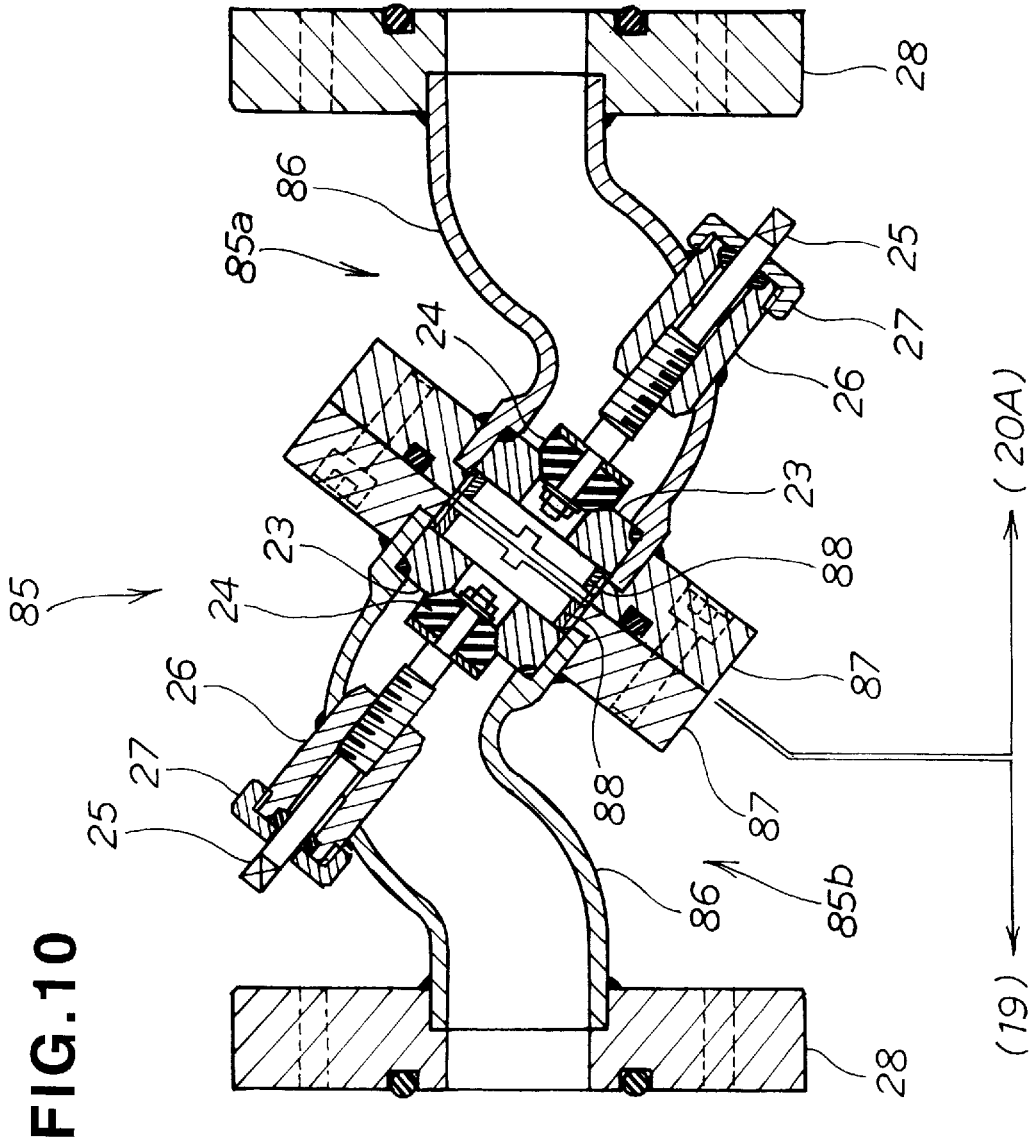
FIG. 10 is a longitudinal cross-sectional view showing a twin stop valve according to the present invention.

The stop valve 20A shown in FIG. 3 may be replaced by a twin stop valve 65 in which instance the stop valve 19 shown in FIG. 1 can be omitted. As shown in FIG. 10, the twin stop valve 85 includes two stop valve assemblies 85a, 85b of identical construction that are connected together in symmetric relation. The stop valve assemblies 85a, 85b each include a valve case 86 bent or curved at its intermediate portion. The valve case 86 has a slip-on brazed flange 28 at one end (proximal end) thereof, and a slip-on brazed flange 87 at the other end (free end) thereof. An annular valve seat 23 is fitted in the other end of the valve case 86 and is secured to this end by means of a retainer ring screw 88 threaded in an internally threaded central hole (not designated) of the flange 87. A valve disc 24 is attached to one end of a valve stem 25 and is seated against the valve seat 23 to block passage of a refrigerant through the stop valve assembly 85a, 85b. The valve stem 25 is supported by a valve stem guide 26 so that by turning the valve stem 25, the valve stem 25 moves in an axial direction. This movement causes the valve disc 24 to engage with or separate from the valve seat 23. The end cap 27 is attached to an outer end of the valve stem guide 26 to close the same. The flanges 87, 87 of the respective stop valve assemblies 85a, 85b are joined together by screws (not designated) so that the two valve stems 25, 25 are aligned with each other and arranged in confrontation.

The valve stem 25 is placed at an angle to the central axis of the proximal and (outer end in FIG. 10) of the valve case 86, the angle being in the range of 30° to 60°, and preferably 45°. The valve stems 25, 25 do not project beyond respective outer edges of the opposite flanges 28, 28, so that the stop valve assembly 85a can pass through a standard piping hole 17 (see FIG. 3) in the same manner as the stop valve 20A previously described with reference to FIG. 3.

When the stop valve assemblies 85a, 85b of the twin stop valve 85 are in the closed state, the refrigerant is trapped within a small space defined between the flanges 87, 87. In the case where the stop valve 85 is used with a JIS 8A pipe, the space has a volume of about 1 to 3 cm³. The refrigerant strapped within such a small space can be easily removed in a short time before the room air-conditioner is disassembled. If a 1 to 3 cm³ or refrigerant is within a legally permitted range, the refrigerant may be emitted to the atmosphere.

Like the foregoing pair of adjacent stop valves 19 and 20A, other pairs of adjacent stop valves 19 and 20B, 18 and 20C, and 18 and 20D may be replaced by three twin stop valves 85.

Figure 11:
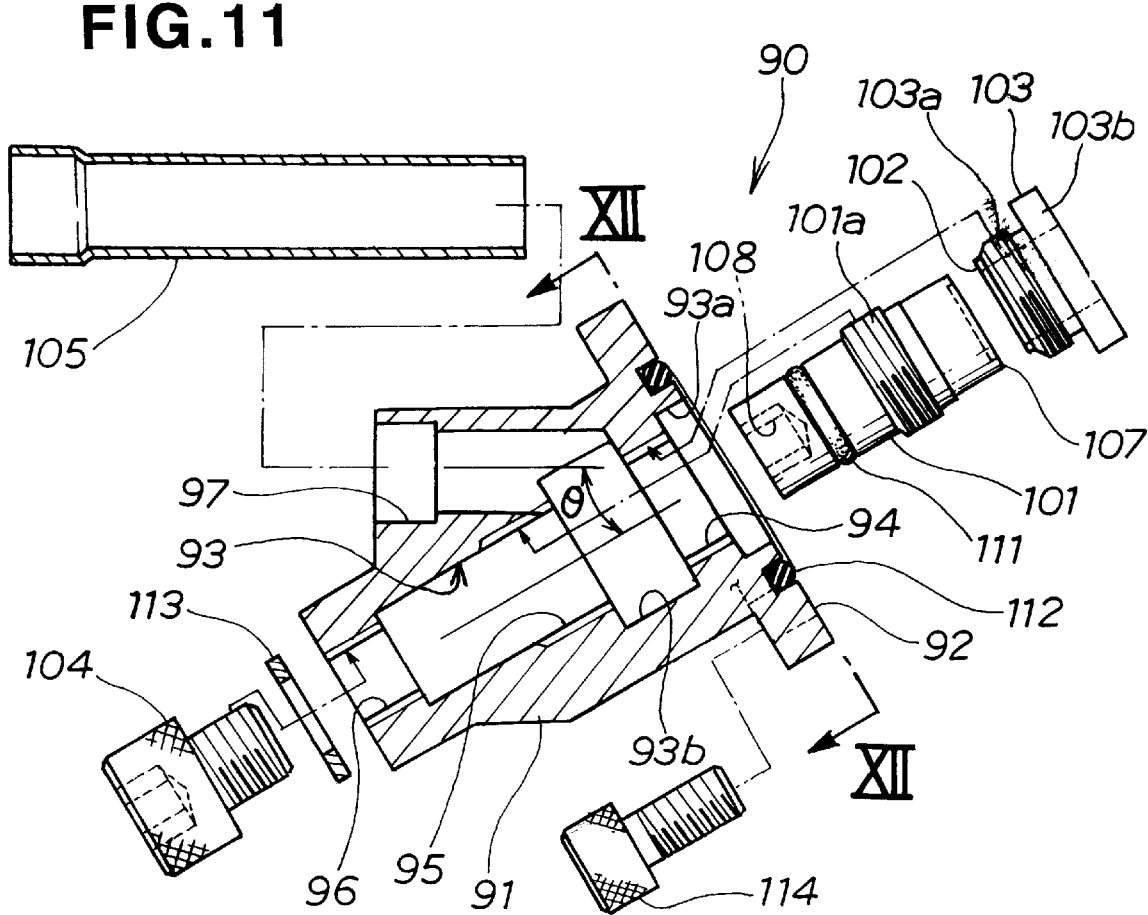
FIG. 11 is an exploded view, with parts in cross section, of another modified stop valve according to the present invention.

FIG. 11 shows in exploded view a stop valve 90 according to another embodiment of the present invention.

The stop valve 90 includes a generally hollow cylindrical valve case 91 having an axial through-hole 93 and an integral flange 92 formed at an end of the valve case 91. The axial through-hole 93 is a multi-stepped hole and includes a large-diameter seat portion 93a, a first internally threaded portion 94, a larger-diameter valve chamber portion 93b, a second internally threaded portion 95, and a third internally threaded portion 96. All the portions 93a, 94, 93b, 95 and 96 are arranged in the order named when viewed from the flanged end of the valve case 91. The valve case 91 also has a stepped pipe-receiving hole 97 extending at an angle θ to the axial through-hole 93. The angle θ is in the range of 30° to 60°, and preferably 45°.

A circular cylindrical valve stem 101 has an externally threaded intermediate portion 101a, an integral valving element 107 at one end thereof, and a hexagonal hole 108 at the opposite end thereof. The valve stem 101 having the externally threaded intermediate portion 101a is threaded into the second internally threaded portion 95 of the axial through-hole 93. An O-ring 111 is fitted around a portion of the valve stem 101 located intermediately between the externally threaded portion 101a and the opposite end of the valve stem 101.

An annular end busing 103 has an externally threaded stem 103a and an enlarged head 103b at an end of the stem 103a. A valve seat 102 is formed integrally with a tip end of the stem 103a. The end bushing 103 is threaded into the first internally threaded portion 94 of the axial through-hole 93 until the enlarged head 103b is seated against a shoulder of the large-diameter seat portion 93a.

An end plug 104 is in the form of a screw and is threaded into the third internally threaded portion 96 of the axial through-hole 93 to close an end of the through-hole 93. A ring gasket 113 is fitted around a stem of the end plug 104 so as to provide a hermetic seal between the end plug 104 and the valve case 91.

A copper refrigerant pipe 105 of a desired length is fitted in the stepped pipe-receiving hole 97 in the valve case 91 and is brazed to the valve case 91.

In FIG. 11, reference numeral 114 denotes a screw used for attaching the stop valve 90 to a similar stop valve (not shown). Numeral 112 is an O-ring fitted in an annular groove (not designated) in the flange 92.

Figure 12:
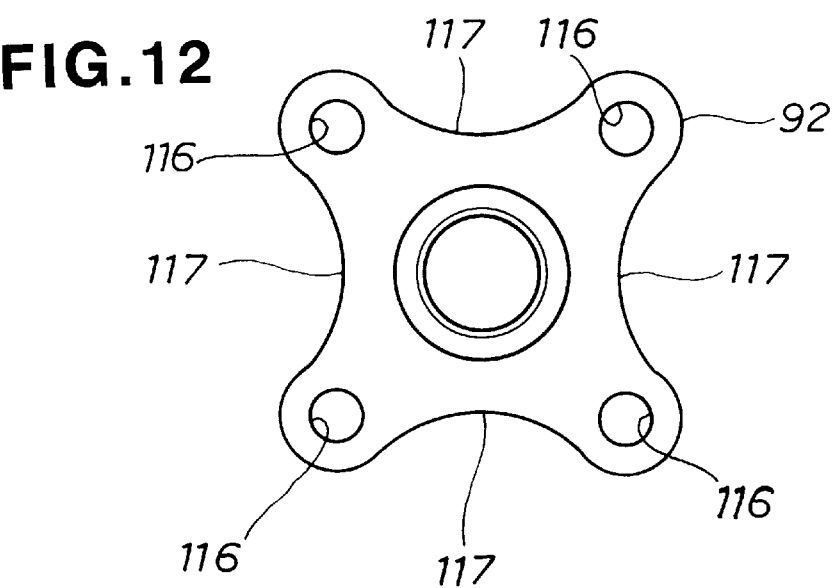
FIG. 12 is a view looking in the direction of the arrows XII—XII of FIG. 11.

As shown in FIG. 12, the flange 92 has a somewhat distorted square shape including four concaved side edge portions 117 each extending between one pair of adjacent holes 116 formed at four corners of the distorted square flange 92. The concaved side edge portions 117 are provided to reduce the weight of the flange 92.

Figure 13:
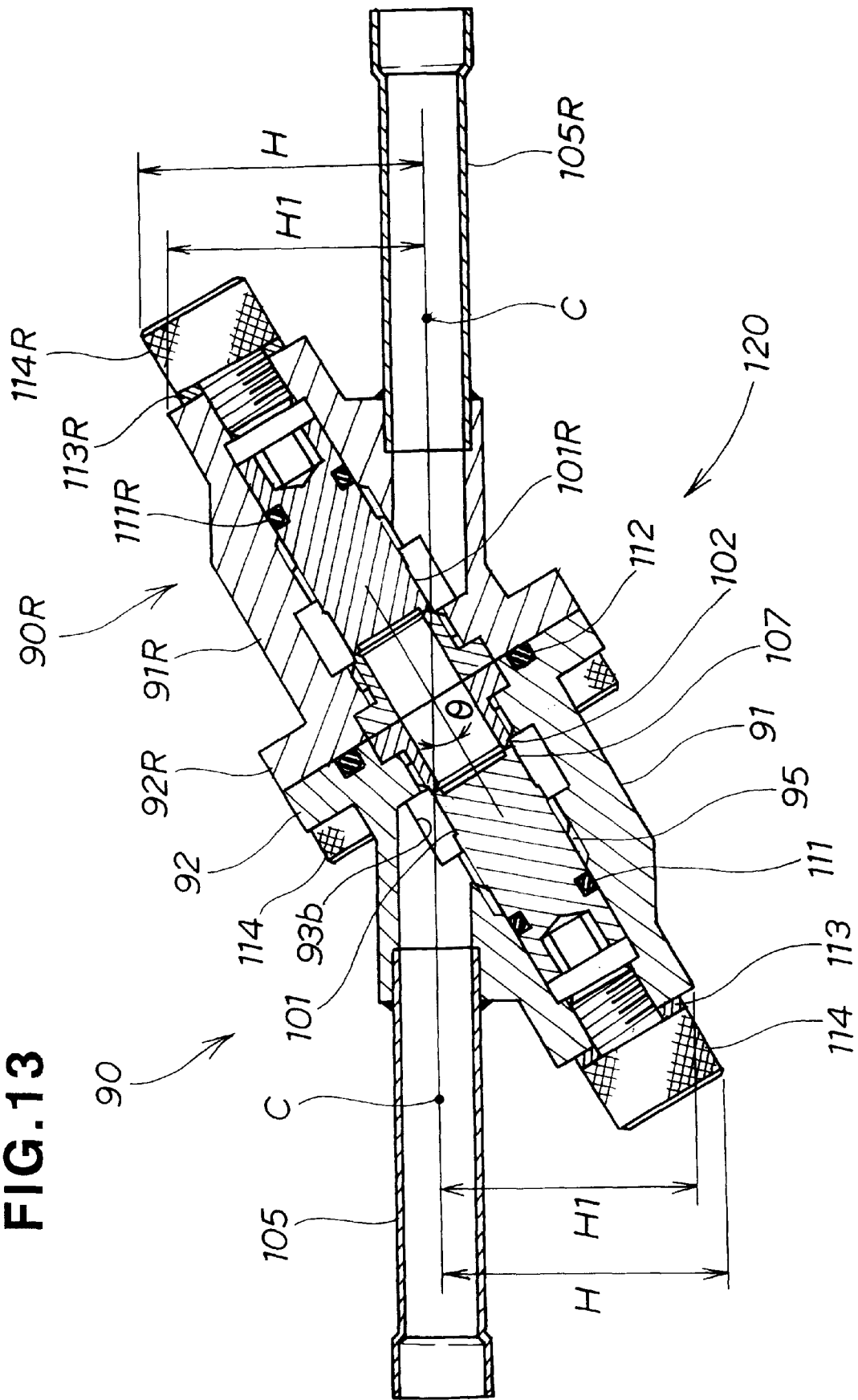
FIG. 13 is a longitudinal cross-sectional view showing a modified twin stop valve according to the present invention.

The stop valve 90 shown in FIG. 11 may be assembled with a similar stop valve 90R to form a twin stop valve 120 shown in FIG. 13. The stop valve 90R is structurally and functionally the same as the stop valve 90R with the exception that a flange 92R is flat and does not have an annular groove for receiving an O-ring. Due to the structural and functional similarity, detailed description of the stop valve 90R is not necessary. For convenience of explanation, these parts of the stop valve 90R which are corresponding to those of the stop valve 90 are designed by the same reference numerals with the letter "R" affixed thereto.

The twin stop valve 120 is formed by bolting together the flange 92, of the stop valve 90 and the flange 92R of the stop valve 90R. In the assembled condition, the refrigerant pipe 105 of the stop valve 90 and the refrigerant pipe 105R of the stop valve 90R are aligned with each other.

The stop valves 90, 90R shown in FIG. 13 are in the closed state in which the valving members 107, 107R are seated against the corresponding valve seats 102, 102R. Now, assuming that a refrigerant is fed through the refrigerant pipe 105 into the stop valve 90, the refrigerants fills in the valve chamber portion 93b, then entering the second internally threaded portion 95. A further advancing movement of the refrigerant is completely blocked by a two-stage sealing structure formed by the O-ring 111 and the gasket 113.

The O-ring 112 may be replaced by an annular sheet gasket (not shown) in which instance two identical stop valves can be used in combination to form a twin stop valve.

Because the valve stems 101, 101R are placed at the angle θ to the common central axis C of the refrigerant pipes 105, 105R, the maximum outside diameter (H+H) of the twin stop valve 120 is much smaller than that of the conventional stop valves.

Figure 14A:
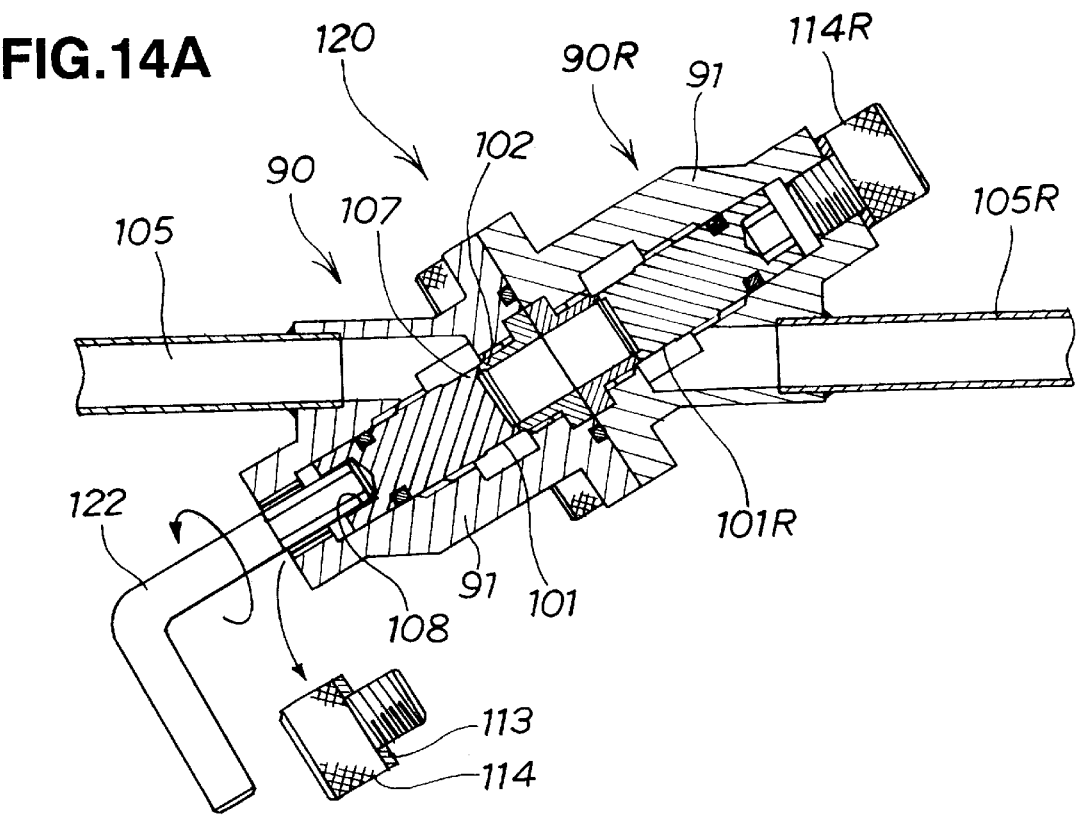
FIGS. 14A and 14B are cross-sectional views illustrative of the manner in which a valve stem is displaced relative to a valve seat to change the position of the stop valve.

When the stop valve 90 shown in FIG. 13 is to be opened, the end plug 114 is removed from the valve case 91. Subsequently, as shown in FIG. 14A, a suitable tool such as a hexagonal bar wrench 122 is inserted into the hexagonal hole 108 of the valve stem 101, then turned in a valve-opening direction until the valving member 107 reaches its fully open position shown in FIG. 14B. Repeating the same operation for the stop valve 90R places the valving element 107R in the fully open position shown in FIG. 14B. Then, the end plugs 114, 114R are attached to the valve cases 91, 91R.

Figure 14B:
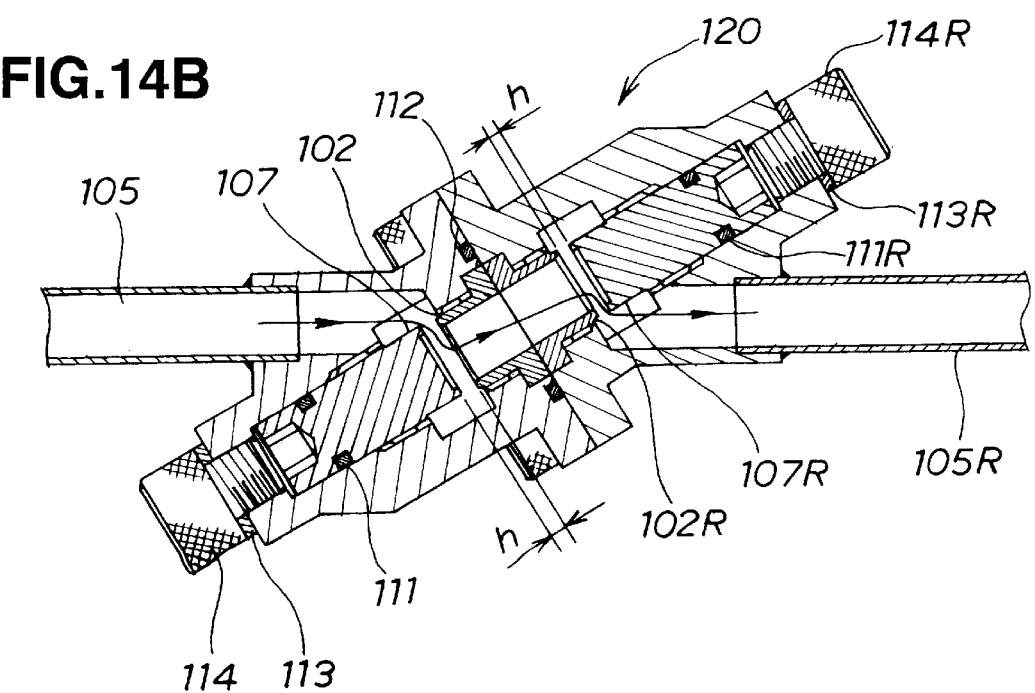

In the fully open position, the valving members 107 are spaced from the corresponding valve seats 102, 102R by a distance h, so that the refrigerant can flow through the two stop valves 90, 90R in the direction indicated by the arrow shown in FIG. 14B. A combination of the O-ring 111, 111 and the gasket 113, 113R forms a hermetic seal against leakage of the refrigerant. After installation of the room air-conditioner, the twin stop valve 120 is continuously held in the fully open position shown in FIG. 14B until disassembling of the air-conditioner becomes necessary.

As previously described with reference to FIG. 13, the maximum outside diameter (H+H) of the twin stop valve 120 is relatively small. By removing the end plugs 114, 114R from the valve cases 91, 91R, a further reduction of the maximum outside diameter is achieved. This ensures that one of the stop valves 90, 90R attached to one end of each refrigerant pipe can be withdrawn through the piping hole 17 (FIG. 1) to the outside of the building while the other refrigerant pipe is present inside the piping hole 17. While the end plug 114 is removed to facilitate passage of the stop valve 90 through the piping hole 17 (FIG. 1), the refrigerant is trapped inside the valve chamber portion 93b by means of the O-ring 111.

Figure 15:
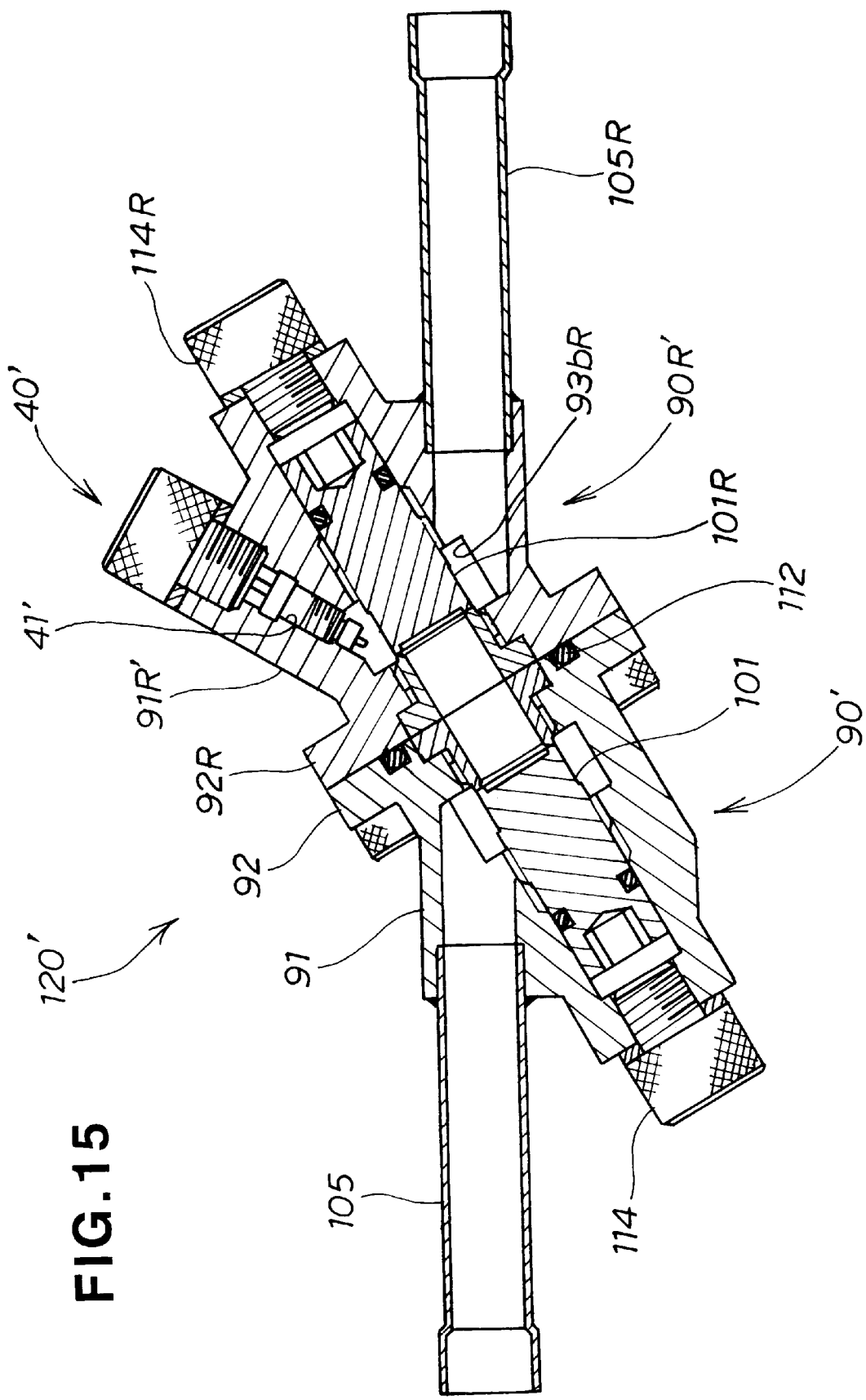
FIG. 15 is a view similar to FIG. 13, but showing a different twin stop valve having a self-closing valve mechanism built in a refrigerant supply hole.

FIG. 15 shows a modified form of the twin stop valve 120 shown in FIG. 13. The modified twin stop valve 120' differs from the twin stop valve 120 of FIG. 13 in that one stop valve 90R' has a refrigerant supply hole 41' equipped with a self-closing valve mechanism 40'. The refrigerant supply hole 41' is formed in the valve case 91R' and is connected at one end to the valve chamber portion 93aR. The self-closing valve mechanism 40' is structurally and functionally the same as the self-closing valve mechanism 40 shown in FIG. 5 and 6, and no further description thereof is necessary. With the self-closing valve mechanism 40 thus provided, the refrigerant can be easily filled in or removed from the refrigerant passage of the room air-conditioner.

Figure 16:
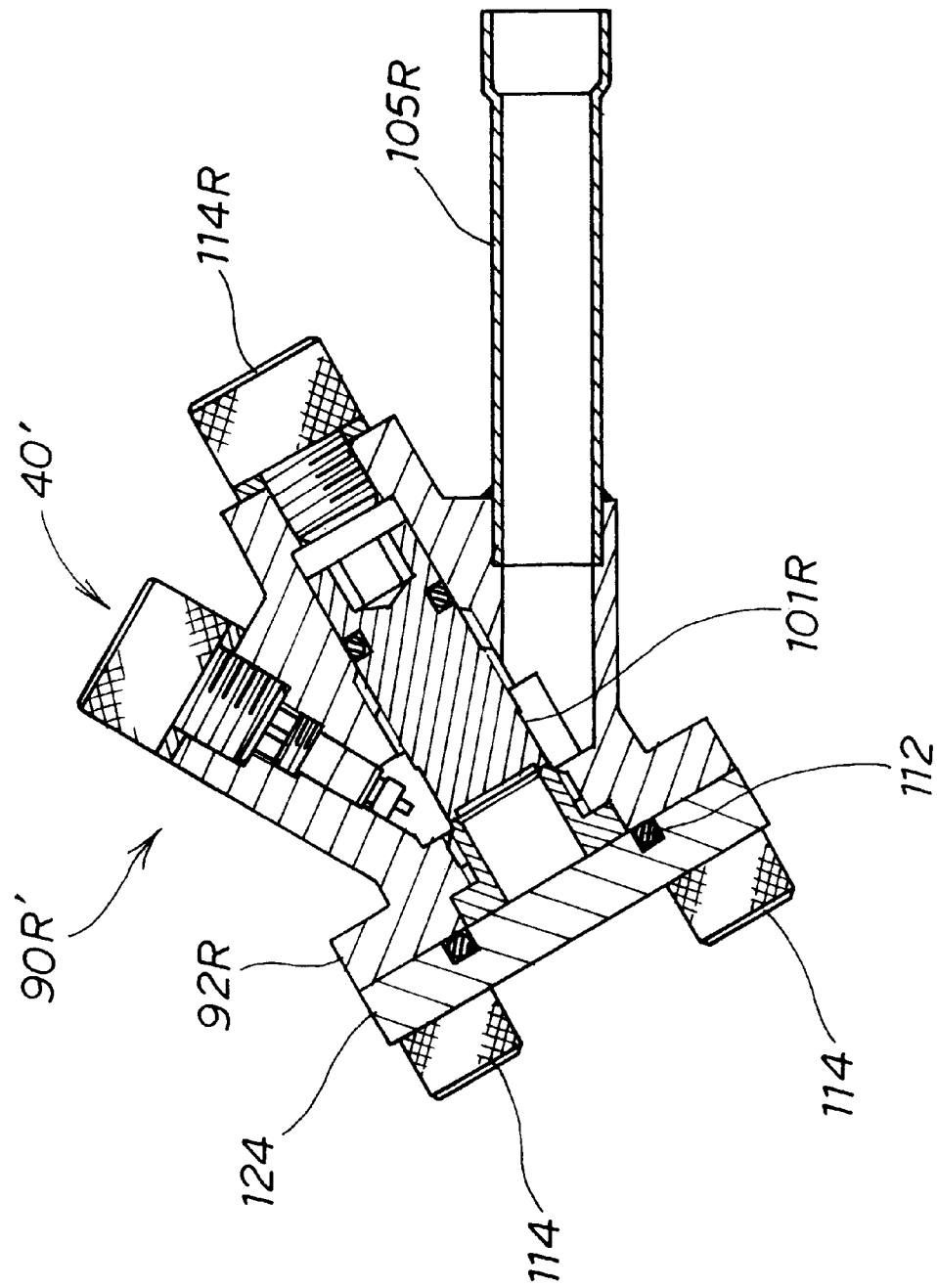
FIG. 16 is a cross-sectional view showing a modification of the twin stop valve shown in FIG. 15.

When the stop valve 90R' shown in FIG. 15 is stored for a long time in a condition separated from the mating stop valve 90', it is preferable to attached a blank flange 122 to the flange 92R of the stop valve 90R' with an O-ring 112 disposed between the two flanges 122, 92R, as shown in FIG. 16. The blank flange 124 thus attached makes the stop valve 90R'60 completely free from leakage of the refrigerant.

Figure 17:
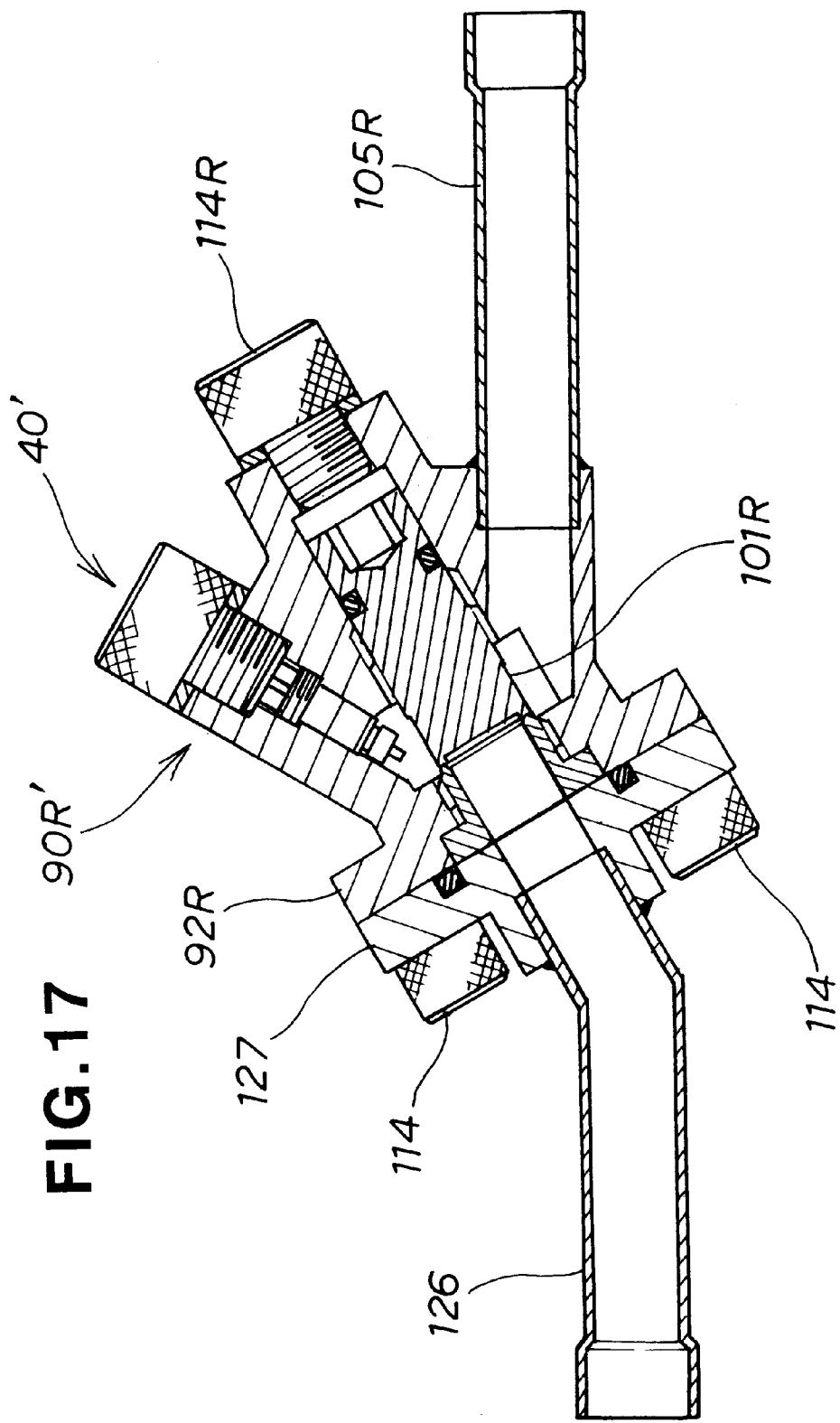
FIG. 17 is a cross-sectional view showing still another modification of the twin stop valve shown in FIG. 5.

A modification shown in FIG. 17 differs from that of FIG. 16 in that an angled copper refrigerant pipe 126 having a slip-on brazed flange 127 at one end thereof is used in place of the blank flange 124 of FIG. 16. The flange 127 is attached by screws 114 to the flange 92R of the stop valve 90R'. The refrigerant pipe 126 is angled such that the central axis of the flanged end is aligned with the central axis of the valve stem 11R, and the central axis of the opposite end is parallel to, and laterally offset from, the central axis of the refrigerant pipe 105R.

In the illustrated embodiments, the stop valves include a valve stem which is paced at an angle to the central axis of a refrigerant pipe to which the stop valve is attached. The stop valves may be replaced with a small ball valve is which instance the direction of movement of a ball may be perpendicular to the central axis of the refrigerant pipe provided that the ball valve can pass through a standard piping hole in the building wall while the other refrigerant pipe is present inside the piping hole.

Additionally, the refrigerant pipe unit may be used in combination with a coupling and a seal structure which include a screwed joint system.

The stop valves of the refrigerant pipe can be used in combination with the indoor unit or the outdoor unit to seal the refrigerant inside the unit. The refrigerant pipe unit according to the present invention is particularly suitable for use with the room air-conditioners. However, this unit can be also used in large-sized refrigerators or freezers including an evaporator and a condenser connected by a pair of refrigerant pipes.

The stop valves of the refrigerant pipe unit can effectively operate regardless of the kind of refrigerant used. Accordingly, any of the known materials eligible for the refrigerant, such as ammonia, fluorocarbons, Freon, CFC (chlorofluorocarbon), HCFC (hydrochloroflourocarbon), HFC (hydroflourocarbon) and the like, can be used with the refrigerant pipe unit of the present invention.

Obviously, various minor changes and modifications of the present invention are possible in the light of the above teaching. It is to be understood that within the scope of the appended claims the present invention may be practiced otherwise than as specifically described.

What is claimed is:

1. A refrigerant pipe unit for the room air-conditioner including an indoor unit disposed inside a building and an outdoor unit disposed on the outside of the building, the building including a wall having a piping hole extending therethrough, and each of the indoor and outdoor units having two valves attached to an inlet and an outlet of each unit, said refrigerant pipe unit comprising:

two refrigerant pipes extending through the piping hole in the building wall and interconnecting the indoor unit and the outdoor unit via the four valves attached to the inlets and outlets of the indoor and outdoor units so as to form a refrigerant passage for circulation of a refrigerant through the room air-conditioner; and a stop valve attached to at least one of opposite ends of each of said two refrigerant pipes and adapted to be closed to trap the refrigerant inside the corresponding refrigerant pipe, wherein a maximum size of said stop valve of the refrigerant pipe unit, which is measured in a radial direction about the central axis of each refrigerant pipe, is designed such that the stop valve attached to said at least one end of each refrigerant pipe can pass through the piping hole in the building wall while the other refrigerant pipe is present inside the piping hole.

2. A refrigerant pipe unit according to claim 1, wherein said stop valve is attached to said opposite ends of each of said two refrigerant pipes.

3. A refrigerant pipe unit according to claim 1, wherein said stop valve includes a valve stem placed at an angle of 30° to 60 ° to the central axis of said each refrigerant pipe.

4. A refrigerant pipe unit according to claim 3, wherein said angle is 45°.

5. A refrigerant pipe unit according to claim 1, wherein said stop valve and said at least one end of each refrigerant pipe are connected together by a flange coupling, said maximum size of said stop valve being smaller than a maximum radius of said flange coupling.

6. A refrigerant pipe unit according to claim 5, wherein said flange coupling includes a first flange slipped on and brazed to said at least one end of each refrigerant pipe, and a second flange slipped on and brazed to an inlet portion of said stop valve, said first and second flanges being connected together with a seal member disposed therebetween.

7. A refrigerant pipe unit according to claim 6, wherein said first and second flanges each have a recessed arcuate edge portion receptive of a portion of the circumference of said other refrigerant pipe.

8. A refrigerant pipe unit according to claim 6, wherein said stop valve includes a tubular valve case joined at one end to said second flange and having a curved intermediate portion, an annular valve seat fixedly mounted in the other end of said tubular valve case, an internally threaded hollow cylindrical valve stem guide mounted to said curve intermediate portion of said valve case in coaxial relation to said annular valve seat, an externally threaded valve stem threaded into said valve stem guide, a valve disc attached to an inner end of said valve stem and adapted to be engaged with and disengaged from said valve seat for closing and opening said stop valve in response to axial movement of said valve stem, an end cap attached to an outer end of said valve stem guides to close said outer end, a first seal member disposed between said valve seat and said valve case, and a second seal member fitted around said valve stem and held between said valve stem guide and said end cap.

9. A refrigerant pipe unit according to claim 8, wherein said valve stem is placed at an angle of 30° to 60° to the central axis of said each refrigerant pipe.

10. A refrigerant pipe unit according to claim 9, wherein said angle is 45°.

11. A refrigerant pipe unit according to claim 8, said stop valve further includes an additional tubular valve case firmly connected at one end to said other end of said valve case and having a curved intermediate portion, a third flange slip on and brazed to the other end of said additional tubular valve case, said third flange having a refrigerant supply hole extending radially through said third flange and connected at one end to an internal space of said additional valve case, and a self-cloning valve mechanism assembled in said refrigerant supply hole.

12. A refrigerant pipe unit according to claim 11, wherein said valve stem is placed at an angle of 30° to 60° to the central axis of said each refrigerant pipe.

13. A refrigerant pipe unit according to claim 12, wherein said angle is 45°.

14. A refrigerant pipe unit according to claim 11, wherein said stop valve further includes an end plug detachably mounted in an outer end of said refrigerant supply hole to normally close said refrigerant supply hole.

15. A refrigerant pipe unit according to claim 11, wherein said first, second and third flanges each have a recessed arcuate peripheral edge portion receptive of a portion of the circumference of said other refrigerant pipe.

16. A refrigerant pipe unit according to claim 1, wherein said stop valve includes a generally hollow cylindrical valve case having an internally threaded axial through-hole and a pipe-receiving hole extending at an angle to said axial through-hole, an annular valve seat fixedly mounted in one end of said axial through-hole, an externally threaded valve stem threaded into said externally threaded axial through-hole, a valving member formed integrally with an inner end of said valve stem and adapted to be engaged with and disengaged from said valve seat for closing and opening said stop valve in response to axial movement of said valve stem, an end plug detachably mounted in said axial through-hole to close the other end of said axial through-hole, a seal member fitted around said valve stem to seal between said valve stem and said valve case, said pipe-receiving hole being connected at one end to said axial through-hole and at the other end to said one end of each refrigerant pipe.

17. A refrigerant pipe unit according to claim 16, wherein said valve stem received in said axial through-hole is placed at said angle to said pipe-receiving hole, said angle being in the range of 30° to 60°.

18. A refrigerant pipe unit according to claim 17, wherein said angle is 45°.

19. A refrigerant pipe unit according to claim 16, wherein said valve stem has a shaped hole formed at an outer end thereof for receiving a tip end of a tool to cause said axial movement of said valve stem.

20. A refrigerant pipe unit according to claim 16, wherein said valve case further has a refrigerant supply hole connected at one end to said axial through-hole, and a self-closing valve mechanism assembled in said refrigerant supply hole.

21. A refrigerant pipe unit according to claim 20, wherein said stop valve further includes an end plug detachably mounted in the other end of said refrigerant supply hole to normally close said refrigerant supply hole.

* * * * *